United States Patent
Yokota et al.

(10) Patent No.: US 9,136,747 B2
(45) Date of Patent: Sep. 15, 2015

(54) HYBRID EXCITATION ROTATING ELECTRICAL MACHINE

(71) Applicants: Junichi Yokota, Nagoya (JP); Katsuichi Kono, Okazaki (JP); Ken Takeda, Anjo (JP)

(72) Inventors: Junichi Yokota, Nagoya (JP); Katsuichi Kono, Okazaki (JP); Ken Takeda, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 472 days.

(21) Appl. No.: 13/757,421

(22) Filed: Feb. 1, 2013

(65) Prior Publication Data
US 2013/0221788 A1 Aug. 29, 2013

(30) Foreign Application Priority Data

Feb. 29, 2012 (JP) .................................. 2012-044853
Sep. 28, 2012 (JP) .................................. 2012-218215

(51) Int. Cl.
*H02K 21/12* (2006.01)
*H02K 21/04* (2006.01)
*H02K 1/27* (2006.01)
*H02K 3/46* (2006.01)

(52) U.S. Cl.
CPC .............. *H02K 21/04* (2013.01); *H02K 1/2786* (2013.01); *H02K 3/46* (2013.01); *H02K 21/046* (2013.01)

(58) Field of Classification Search
USPC .......... 310/156.36–156.37, 156.49, 112–114, 310/266
See application file for complete search history.

(56) References Cited

U.S. PATENT DOCUMENTS

| 3,743,873 | A | * | 7/1973 | de Jong ......................... 310/165 |
| 4,496,868 | A | * | 1/1985 | Advolotkin et al. .......... 310/112 |
| 5,030,867 | A | * | 7/1991 | Yamada et al. ........... 310/156.25 |
| 5,233,248 | A | * | 8/1993 | Kawamura et al. ............. 310/88 |
| 5,397,975 | A | * | 3/1995 | Syverson ......................... 322/46 |
| 5,672,926 | A |   | 9/1997 | Brandes et al. |
| 5,677,582 | A | * | 10/1997 | Lutz et al. ................... 310/75 R |
| 5,682,073 | A |   | 10/1997 | Mizuno |
| 5,731,647 | A | * | 3/1998 | Schuller et al. ............... 310/114 |
| 6,229,239 | B1 |   | 5/2001 | Lucidarme et al. |
| 7,023,121 | B2 |   | 4/2006 | Kusase et al. |
| 7,064,466 | B2 |   | 6/2006 | Kusase |

(Continued)

FOREIGN PATENT DOCUMENTS

JP A-6-351206 12/1994
JP A-8-251891 9/1996

(Continued)

OTHER PUBLICATIONS

Apr. 16, 2013 International Search Report issued in International Patent Application No. PCT/JP2013/051009 (with translation).

*Primary Examiner* — Thanh Lam
(74) *Attorney, Agent, or Firm* — Oliff PLC

(57) ABSTRACT

A hybrid excitation machine comprising a rotor having first and second rotor cores with an axial gap between; a stator placed radially outward of the rotor; and an exciting coil fixed to the stator placed in an air gap between the stator and rotor to protrude radially inward from the stator. In an axial direction, an axial end of a radially outer end of the first rotor core located on the second rotor core side and the second rotor core are positioned on opposite sides of an axial end of the exciting coil located on the first rotor core side, and an axial end of a radially outer end of the second rotor core located on the first rotor core side and the first rotor core are positioned on opposite sides of the axial end of the exciting coil located on the second rotor core side.

18 Claims, 14 Drawing Sheets

(56) References Cited

U.S. PATENT DOCUMENTS

| | | |
|---|---|---|
| 7,078,840 B2 | 7/2006 | Kusase |
| 7,755,243 B2 | 7/2010 | Mizutani et al. |
| 7,969,056 B2 | 6/2011 | Mizutani et al. |
| 2003/0102758 A1 | 6/2003 | Kusase et al. |
| 2005/0236920 A1 | 10/2005 | Kusase et al. |
| 2006/0082238 A1 | 4/2006 | Kusase et al. |

FOREIGN PATENT DOCUMENTS

| | | |
|---|---|---|
| JP | A-2001-521720 | 11/2001 |
| JP | A-2003-164127 | 6/2003 |
| JP | B2-3724416 | 12/2005 |
| JP | B2-4623471 | 2/2011 |
| JP | B2-4623472 | 2/2011 |

* cited by examiner

F I G . 1
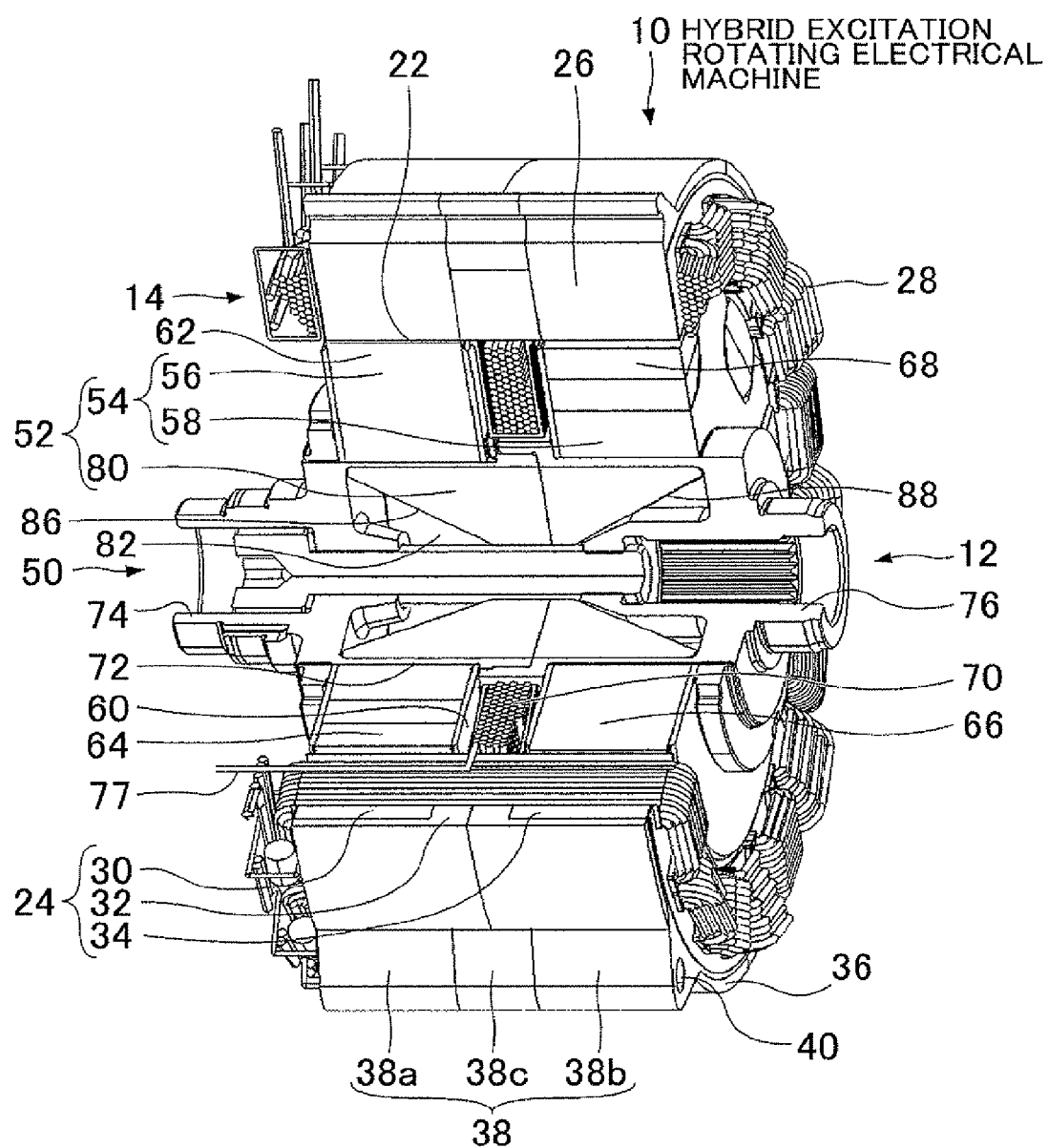

F I G . 4
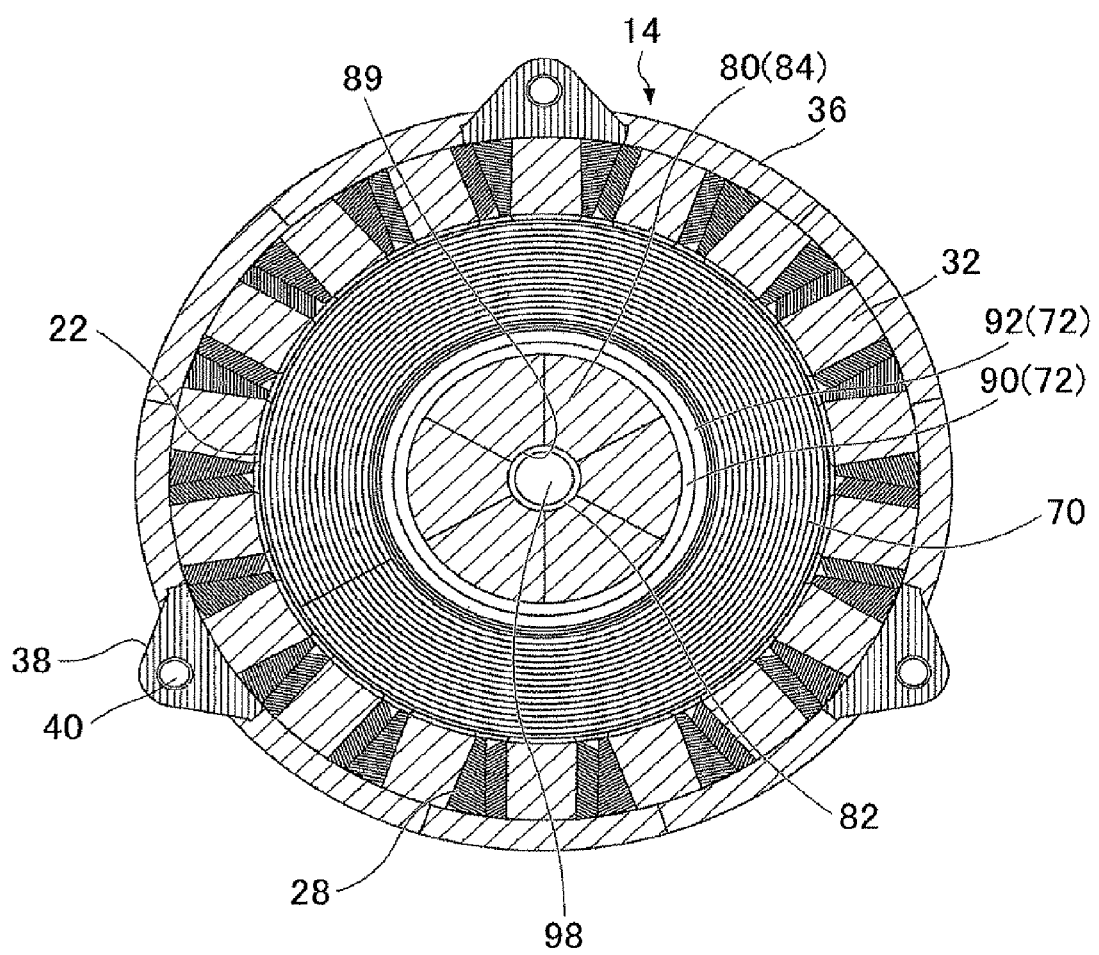

F I G . 10
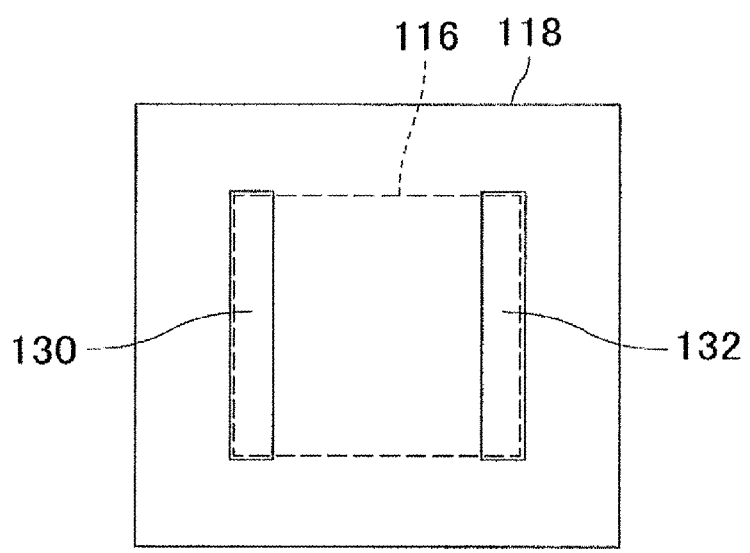

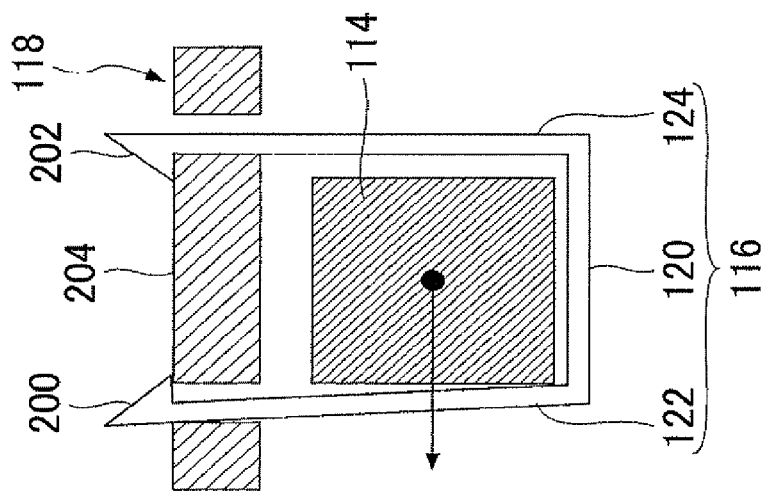
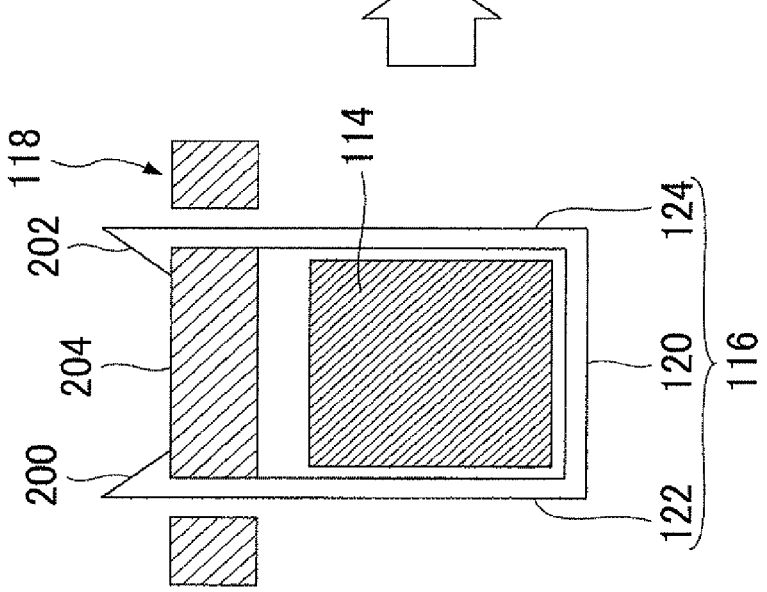

HYBRID EXCITATION ROTATING ELECTRICAL MACHINE

INCORPORATION BY REFERENCE

The disclosure of Japanese Patent Application No. 2012-044853 filed on Feb. 29, 2012 and Japanese Patent Application No. 2012-218215 filed on Sep. 28, 2012 including the specification, drawings and abstract is incorporated herein by reference in its entirety.

BACKGROUND OF THE INVENTION

The present invention relates to hybrid excitation rotating electrical machines, and more particularly to hybrid excitation rotating electrical machines using both a permanent magnet and an electromagnet as an exciting circuit.

DESCRIPTION OF THE RELATED ART

Conventionally, hybrid excitation rotating electrical machines including a permanent magnet and an electromagnet are known in the art (see, e.g., Japanese Patent Application Publication No. H08-251891 (JP H08-251891 A) and Japanese Patent No. 3724416). Such a rotating electrical machine includes a rotor and a stator placed radially outward of the rotor to generate a rotating magnetic field rotating the rotor. The stator has a stator core and a stator coil. The rotor has a shaft extending in the axial direction, and first and second rotor cores separated in the axial direction. Each of the first and second rotor cores has permanent magnet excitation magnetic poles that are excited by a permanent magnet, and non-excited permanent magnet non-excitation magnetic poles that are not excited by the permanent magnet, and the permanent magnet excitation magnetic poles and the permanent magnet non-excitation magnetic poles are alternately arranged in the circumferential direction in the radial end of each of the first and second rotor cores. The permanent magnet excitation magnetic poles in the first rotor core and the permanent magnet excitation magnetic poles in the second rotor core have polarities that are inverted with respect to each other. The permanent magnet excitation magnetic poles in the first rotor core are placed so as to face the permanent magnet non-excitation magnetic poles in the second rotor core in the axial direction, and the permanent magnet non-excitation magnetic poles in the first rotor core are placed so as to face the permanent magnet excitation magnetic poles in the second rotor core in the axial direction.

The amount of magnetic flux of the permanent magnet is substantially constant. The rotating electrical machine further includes an exciting coil that excites the permanent magnet non-excitation magnetic poles. When current is applied from the outside to the exciting coil, the exciting coil excites the permanent magnet non-excitation magnetic poles to generate magnetic flux that weakens or strengthens the magnetic flux generated by the permanent magnet. Thus, according to the above rotating electrical machine, the rotor can be appropriately rotated by combined magnetic flux of the magnetic flux of the permanent magnet and the magnetic flux of the electromagnet.

SUMMARY OF THE INVENTION

In the rotating electrical machine of JP 8-251891 A, the exciting coil is fixed to the rotor. Accordingly, in such a rotating electrical machine, it is necessary to provide the exciting coil with reinforcement etc. against centrifugal force associated with rotation of the rotor and to mount a slip ring to extend an external electric wire from the exciting coil. This reduces a coil space or increases the size of the device itself.

In the rotating electrical machine of Japanese Patent No. 3724416, the exciting coil is fixed to the stator, but is placed in a gap formed in an inner part of the rotor, specifically an inner part that is located between the first and second rotor cores separated in the axial direction and that is separated from the radially inner surface of the stator toward the axial center, so that the exciting coil is surrounded by the rotor. Accordingly, in this structure, a radial gap between the rotor and the stator, a radial gap between the rotor and the radially outer surface of the exciting coil, and a radial gap between the rotor and the radially inner surface of the exciting coil are formed as air gap on a cross section including the exciting coil, thereby creating a large amount of dead space, and thus increasing the size of the device itself.

The present invention was developed to solve the above problems, and it is an object of the present invention to provide a hybrid excitation rotating electrical machine capable of implementing formation of a desired magnetic circuit without increasing the size, by placing at an appropriate position an exciting coil that excites permanent magnet non-excitation magnetic poles.

The above object is achieved by a hybrid excitation rotating electrical machine including: a rotor having first and second rotor cores that are separated in an axial direction with a gap between the rotor cores, wherein first magnetic poles that are excited by a permanent magnet and second magnetic poles that are not excited by the permanent magnet are alternately arranged in a circumferential direction in each of the first and second rotor cores, the first magnetic poles of the first rotor core have a different polarity from that of the first magnetic poles of the second rotor core, and the first magnetic poles of one of the first and second rotor cores are placed so as to face the second magnetic poles of the other of the first and second rotor cores in the axial direction with the gap between the rotor cores; a stator that is placed radially outward of the rotor with an air gap between the stator and the rotor, and that generates a rotating magnetic field rotating the rotor; and an exciting coil that is fixed to the stator, that is placed in the gap so as to protrude radially inward from the stator, and that excites the second magnetic poles, wherein an axial end of a radially outer end of the first rotor core, which is located on the second rotor core side, and the second rotor core are positioned on opposite sides in the axial direction of an axial end of the exciting coil, which is located on the first rotor core side, and an axial end of a radially outer end of the second rotor core, which is located on the first rotor core side, and the first rotor core are positioned on opposite sides in the axial direction of the axial end of the exciting coil, which is located on the second rotor core side.

According to the present invention, formation of a desired magnetic circuit can be implemented without increasing the size, by placing at an appropriate position an exciting coil that excites permanent magnet non-excitation magnetic poles.

BRIEF DESCRIPTION OF THE DRAWINGS

FIG. 1 is a perspective view showing the structure of a hybrid excitation rotating electrical machine according to a first embodiment of the present invention;

FIG. 4 is a sectional view of the hybrid excitation rotating electrical machine according to the first embodiment of the present invention taken along line IV-IV in FIG. 2;

FIG. 10 is a diagram showing an attachment member forming the hybrid excitation rotating electrical machine according to the second embodiment of the present invention as viewed from the side of an axis;

FIG. 11A and FIG. 11B show sectional views of a main part of a comparative example, illustrating effects of the hybrid excitation rotating electrical machine according to the second embodiment of the present invention;

DETAILED DESCRIPTION OF THE EMBODIMENTS

Specific embodiments of a hybrid excitation rotating electrical machine according to the present invention will be described below with reference to the accompanying drawings.

First Embodiment

FIG. 1 is a perspective view showing the structure of a hybrid excitation rotating electrical machine 10 according to a first embodiment of the present invention. The hybrid excitation rotating electrical machine 10 is shown partially cut-away in FIG. 1.

Figure 2:
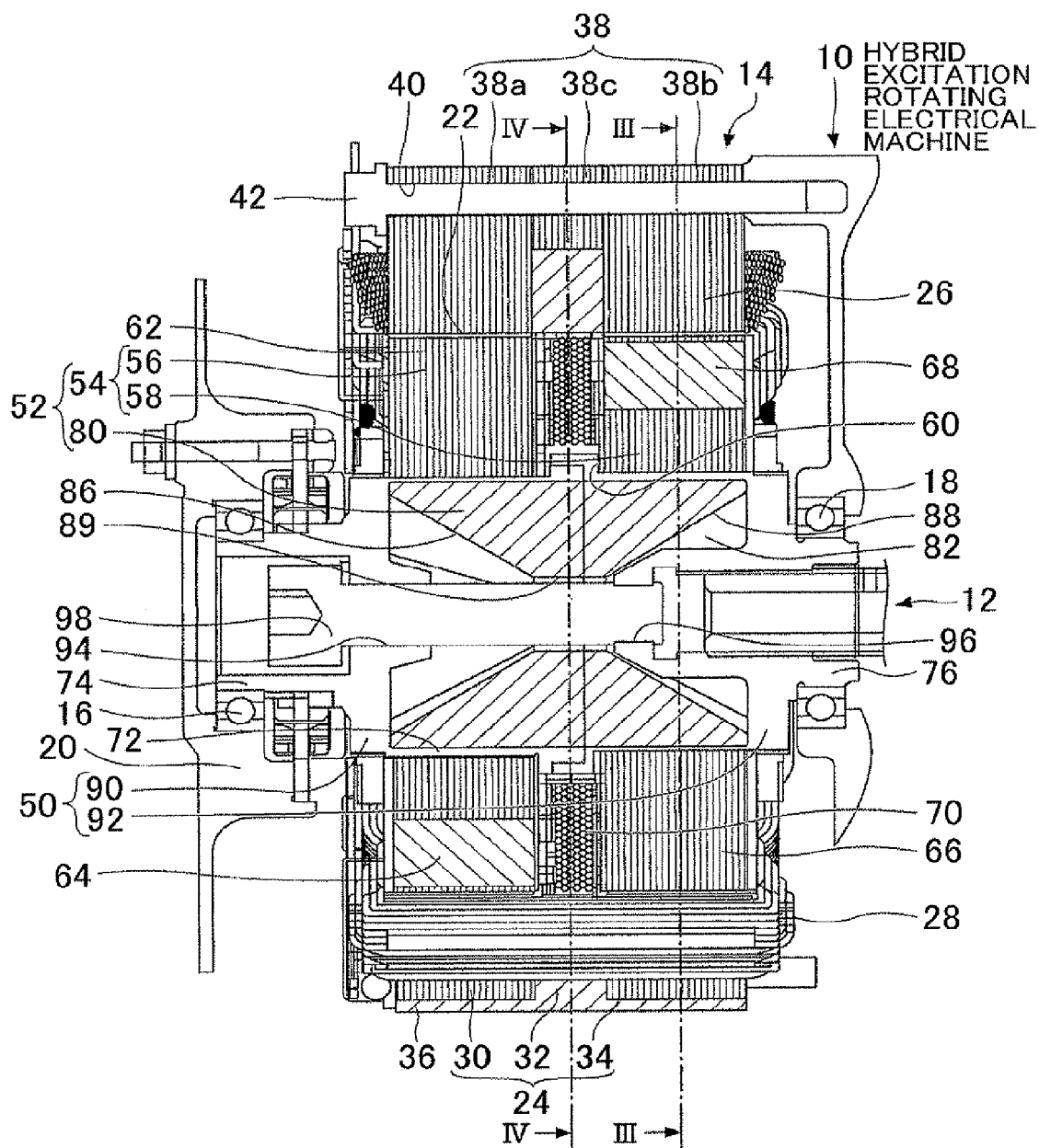
FIG. 2 is a sectional view of the hybrid excitation rotating electrical machine according to the first embodiment of the present invention taken along a plane including an axis line.
Figure 3:
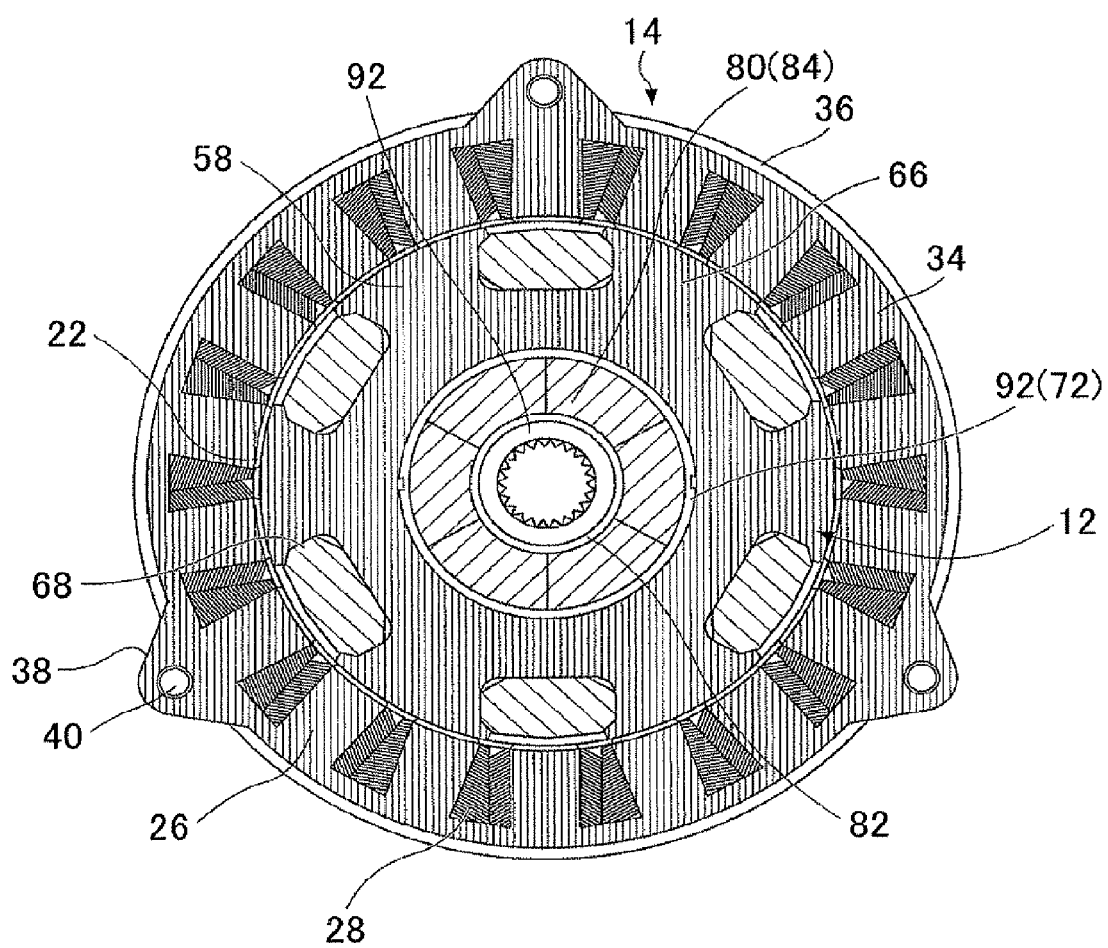
FIG. 3 is a sectional view of the hybrid excitation rotating electrical machine according to the first embodiment of the present invention taken along line III-III in FIG. 2.
Figure 5:
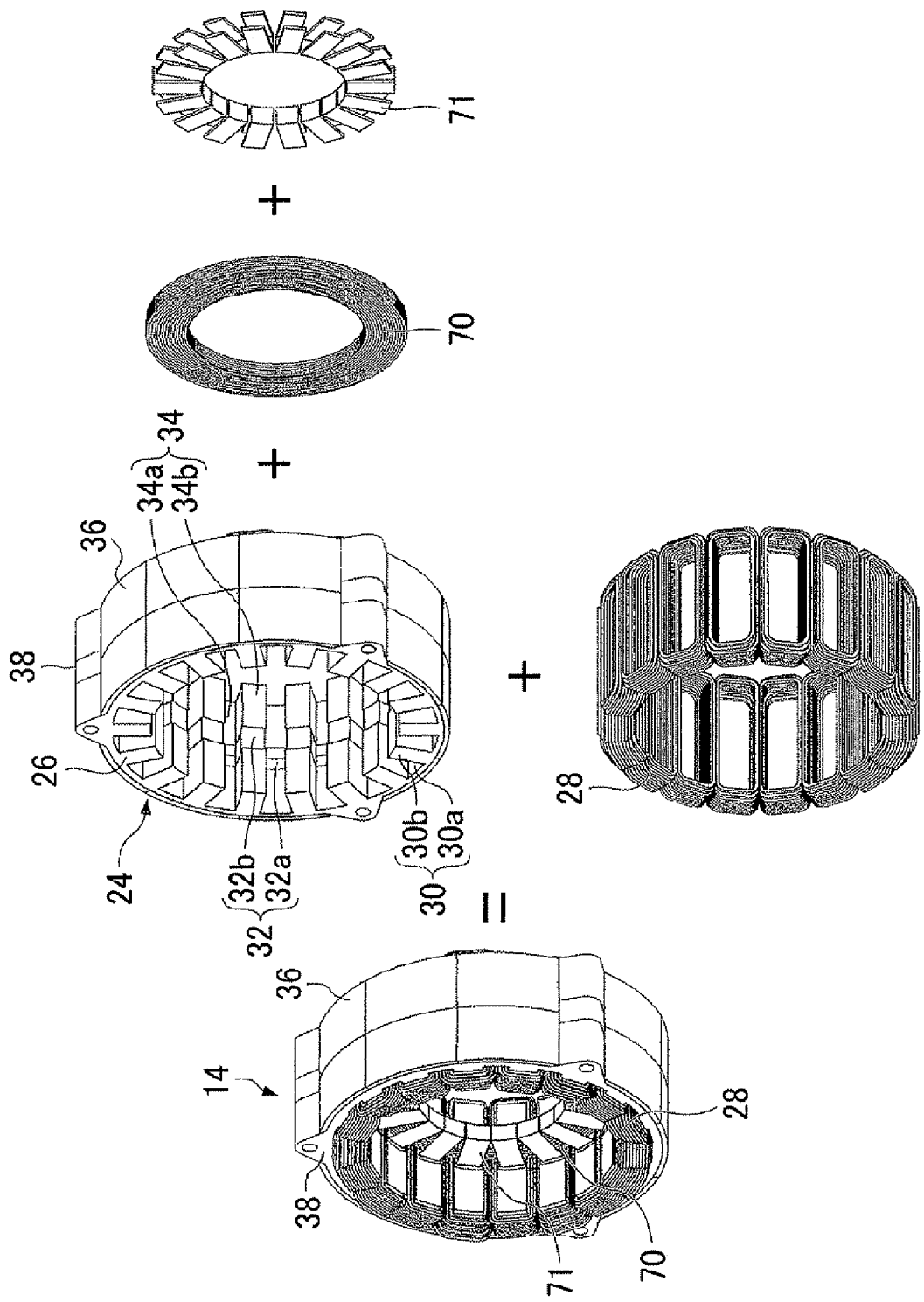
FIG. 5 shows an overall perspective view and an exploded perspective view of a stator of the hybrid excitation rotating electrical machine according to the first embodiment of the present invention.
Figure 6:
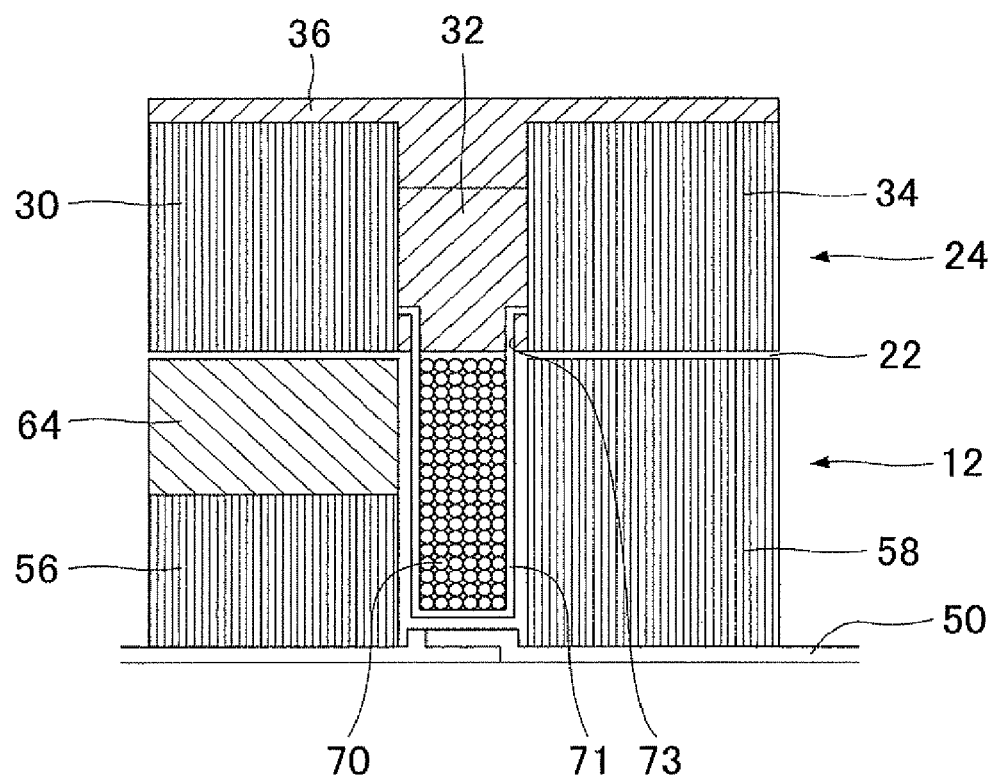
FIG. 6 is a sectional view of a main part of the hybrid excitation rotating electrical machine according to the first embodiment of the present invention.

FIG. 2 is a sectional view of the hybrid excitation rotating electrical machine 10 of the present embodiment taken along a plane including an axis line. FIG. 3 is a sectional view of the hybrid excitation rotating electrical machine 10 of the present embodiment taken along line III-III in FIG. 2. FIG. 4 is a sectional view of the hybrid excitation rotating electrical machine 10 of the present embodiment taken along line IV-IV in FIG. 2. FIG. 5 shows an overall perspective view and an exploded perspective view of the hybrid excitation rotating electrical machine 10 according to the present embodiment. FIG. 6 is a sectional view of a main part of the hybrid excitation rotating electrical machine 10 according to the present embodiment.

In the present embodiment, the hybrid excitation rotating electrical machine 10 includes a rotor 12 that is rotatable about an axis, and a stator 14 that generates a rotating magnetic field rotating the rotor 12. The rotor 12 is rotatably supported by a case 20 via bearings 16, 18 at both axial ends. The stator 14 is placed radially outward of the rotor 12, and is fixed to the case 20. The rotor 12 and the stator 14 face each other in the radial direction with an air gap 22 of a predetermined length therebetween.

The stator 14 has a stator core 24 and a stator coil 28. The stator core 24 is formed in a hollow cylindrical shape. A stator tooth 26 is formed on the radially inner surface of the stator core 24. The stator tooth 26 protrudes inward in the radial direction of the stator core 24, namely toward the axis, and extends between the axial ends of the stator core 24. A plurality (e.g., 12 or 18) of the stator teeth 26 are provided in the circumferential direction on the radially inner surface of the stator core 24, and are arranged at regular intervals along the circumferential direction.

The stator coil 28 is wound around each stator tooth 26. A plurality (e.g., 12 or 18) of the stator coils 28 are provided in the circumferential direction in the radially inner surface of the stator core 24, and are arranged at regular intervals along the circumferential direction. In the case where the hybrid excitation rotating electrical machine 10 is applied to, e.g., a three-phase alternating current (AC) motor, each stator coil 28 forms one of a U-phase coil, a V-phase coil, and a W-phase coil.

The stator core 24 is divided in the axial direction, and has a first stator core 30, a second stator core 32, and a third stator core 34. The first to third stator cores 30 to 34 are arranged in the axial direction. The first and third stator cores 30, 34 are placed at both axial ends. The second stator core 32 is placed in the center in the axial direction, and is interposed between the first stator core 30 and the third stator core 34 in the axial direction. The stator core 24 is thus divided in the axial direction into the second stator core 32 located in the center in the axial direction and the first and third stator cores 30, 34 located on both sides of the second stator core 32 in the axial direction.

The first to third stator cores 30 to 34 are formed in a hollow cylindrical shape, and have substantially the same inner diameter and substantially the same outer diameter. Each of the first to third stator cores 30 to 34 is formed by a back yoke portion 30a, 32a, 34a formed in an annular shape, and a stator teeth portion 30b, 32b, 34b protruding from the radially inner surface of the back yoke portion 30a, 32a, 34a toward the axis. In each of the first to third stator cores 30 to 34, the back yoke portion 30a, 32a, 34a is formed integrally with the stator teeth portion 30b, 32b, 34b. In each of the first to third stator cores 30 to 34, the back yoke portion 30a, 32a, 34a and the stator teeth portion 30b, 32b, 34b may be provided as separate members.

The stator teeth portions 30b, 32b, 34b of the first to third stator cores 30 to 34 are provided so as to be arranged next to each other in the axial direction, and together form each stator tooth 26. The stator coil 28 is wound around each stator tooth 26, and each stator coil 28 is formed so as to extend through the first to third stator cores 30 to 34 in the axial direction in a slot between the stator teeth 26 located next to each other in the circumferential direction.

Each of the first and third stator cores 30, 34 is an electromagnetic steel plate core formed by stacking a plurality of insulation coated electromagnetic steel plates in the axial direction. The second stator core 32 is a dust core made of a soft magnetic material such as iron, specifically a material produced by compression molding insulation coated soft magnetic material powder. The magnetic resistance in the axial direction of the second stator core 32 is lower than that in the axial direction of the first and third stator cores 30, 34.

A thin cylindrical yoke 36 is provided radially outward of the stator core 24. The yoke 36 is formed so as to cover the entire outer peripheries of the first to third stator cores 30 to 34, and supports the first to third stator cores 30 to 34. Like the second stator core 32, the yoke 36 is a dust core made of a material produced by compression molding insulation coated soft magnetic material powder. The magnetic resistance in the axial direction of the yoke 36 is lower than that in the axial direction of the first and third stator cores 30, 34. The yoke 36 may be formed integrally with the second stator core 32. The yoke 36 is bonded and fixed to the radially outer surfaces of the first stator core 30 and the third stator core 34. The first stator core 30 and the third stator core 34 are magnetically coupled together via the yoke 36 and the second stator core 32.

The stator core 24 has an attachment portion 38 that protrudes outward in the radial direction and that attaches and fixes the stator 14 to the case 20. The attachment portion 38 is formed by a plurality of electromagnetic steel plates that are stacked in the axial direction. The attachment portion 38 has an attachment portion 38a formed integrally with the first stator core 30, an attachment portion 38b formed integrally with the third stator core 34, and an attachment portion 38c interposed between the attachment portions 38a, 38b. The attachment portion 38c is placed radially outward of the second stator core 32. The attachment portion 38c may be formed integrally with the second stator core 32 instead of being formed by the plurality of electromagnetic steel plates that are stacked in the axial direction. A plurality of (e.g., 3) the attachment portions 38 are provided in the circumferential direction. A through hole 40 is provided in each attachment portion 38 so as to extend therethrough in the axial direction. The stator 14 is fixed to the case 20 by tightening into the case 20 bolts 42 extending through the through holes 40 of the attachment portions 38.

The rotor 12 is placed radially inward of the stator 14. The rotor 12 has a shaft 50 and a rotor core 52. The shaft 50 extends in the axial direction, and extends beyond the axial ends of the stator 14 at its both axial ends. The shaft 50 need only extend beyond the axial end of the stator 14 on at least one side in the axial direction. The shaft 50 is made of a material having predetermined iron loss, specifically carbon steel such as S45C. The rotor core 52 has a radially outer rotor core 54 that is placed radially outward of the shaft 50 so as to be supported by the shaft 50. The radially outer rotor core 54 is formed in a hollow cylindrical shape, and is fixed to the radially outer surface of the shaft 50.

The radially outer rotor core 54 is divided in the axial direction, and has a first radially outer rotor core 56 and a second radially outer rotor core 58. The first and second radially outer rotor cores 56, 58 are formed in a hollow cylindrical shape, and are placed radially outward of the shaft 50 so as to be supported by the shaft 50. Each of the first and second radially outer rotor cores 56, 58 is formed by stacking a plurality of insulation coated electromagnetic steel plates in the axial direction. The first radially outer rotor core 56 and the second radially outer rotor core 58 are separated from each other in the axial direction with an annular gap 60 therebetween. The gap 60 is formed so as to have substantially the same size along its entire length in the radial direction of the first and second radially outer rotor cores 56, 58.

The radially outer surface of the first radially outer rotor core 56 faces the radially inner surface of the first stator core 30 in the radial direction. That is, the radially outer surface of the first radially outer rotor core 56 and the radially inner surface of the first stator core 30 face each other in the radial direction. The radially outer surface of the second radially outer rotor core 58 faces the radially inner surface of the third stator core 34 in the radial direction. That is, the radially outer surface of the second radially outer rotor core 58 and the radially inner surface of the third stator core 34 face each other in the radial direction. The gap 60 faces the radially inner surface of the second stator core 32, and is provided radially inward of the second stator core 32.

A rotor tooth 62 is formed in the outer periphery of the first radially outer rotor core 56. The rotor tooth 62 protrudes outward in the radial direction of the first radially outer rotor core 56. A plurality (e.g., 6) of the rotor teeth 62 are provided in the circumferential direction on the radially outer surface of the first radially outer rotor core 56, and are arranged at regular intervals along the circumferential direction.

A permanent magnet 64 is attached between the rotor teeth 62 adjoining each other in the circumferential direction, so as to adjoin the rotor teeth 62. The permanent magnet 64 is placed radially outward of the first radially outer rotor core 56. The permanent magnet 64 is, e.g., a ferrite magnet. A plurality (e.g., 6) of the permanent magnets 64 are provided in the circumferential direction, and are provided at regular intervals along the circumferential direction. Each permanent magnet 64 has a predetermined width (angle) in the circumferential direction, and has a predetermined radial thickness. Each permanent magnet 64 is magnetized with a predetermined polarity (e.g., an N pole on the radially outer side and an S pole on the radially inner side).

The radially outer end face of the permanent magnet 64 and the radially outer end face of the rotor tooth 62 are formed at substantially the same distance from the axis. The first radially outer rotor core 56 has permanent magnet excitation magnetic poles that are excited by the permanent magnets 64, and non-excited permanent magnet non-excitation magnetic poles that are not excited by the permanent magnets 64. The permanent magnet non-excitation magnetic poles are formed in the rotor teeth 62. The permanent magnet excitation magnetic poles and the permanent magnet non-excitation magnetic poles are alternately arranged in the circumferential direction. The first radially outer rotor core 56 has a magnetic pole of a different polarity at every predetermined angle, and has a predetermined number (e.g., 12) of magnetic poles in the circumferential direction by the permanent magnet excitation magnetic poles and the permanent magnet non-excitation magnetic poles.

A rotor tooth 66 is formed in the outer periphery of the second radially outer rotor core 58. The rotor tooth 66 protrudes outward in the radial direction of the second radially outer rotor core 58. A plurality (e.g., 6) of the rotor teeth 66 are provided in the circumferential direction on the radially outer surface of the second radially outer rotor core 58, and are arranged at regular intervals along the circumferential direction.

A permanent magnet 68 is attached between the rotor teeth 66 adjoining each other in the circumferential direction, so as to adjoin the rotor teeth 66. The permanent magnet 68 is placed radially outward of the second radially outer rotor core 58. The permanent magnet 68 is, e.g., a ferrite magnet. A plurality (e.g., 6) of the permanent magnets 68 are provided in the circumferential direction, and are provided at regular intervals along the circumferential direction. Each permanent magnet 68 has a predetermined width (angle) in the circumferential direction, and has a predetermined radial thickness. Each permanent magnet 68 is magnetized with a predetermined polarity different from that of the permanent magnet 64 (e.g., an S pole on the radially outer side and an N pole on the radially inner side). That is, the permanent magnet 68 and the permanent magnet 64 have polarities that are inverted with respect to each other.

The radially outer end face of the permanent magnet 68 and the radially outer end face of the rotor tooth 66 are formed at substantially the same distance from the axis. The second radially outer rotor core 58 has permanent magnet excitation magnetic poles that are excited by the permanent magnets 68, and non-excited permanent magnet non-excitation magnetic poles that are not excited by the permanent magnets 68. The permanent magnet non-excitation magnetic poles are formed in the rotor teeth 66. The permanent magnet excitation magnetic poles and the permanent magnet non-excitation magnetic poles are alternately arranged in the circumferential direction. The second radially outer rotor core 58 has a magnetic pole of a different polarity at every predetermined angle, and has the same predetermined number (e.g., 12) of magnetic poles as the first radially outer rotor core 56 in the circumferential direction by the permanent magnet excitation magnetic poles and the permanent magnet non-excitation magnetic poles.

The permanent magnet excitation magnetic poles of the first radially outer rotor core 56 are arranged so as to face the permanent magnet non-excitation magnetic poles of the second radially outer rotor core 58 in the axial direction with the gap 60 therebetween. That is, the permanent magnets 64 of the first radially outer rotor core 56 are arranged so as to face the rotor teeth 66 of the second radially outer rotor core 58 in the axial direction with the gap 60 therebetween. The permanent magnet non-excitation magnetic poles of the first radially outer rotor core 56 are arranged so as to face the permanent magnet excitation magnetic poles of the second radially outer rotor core 58 in the axial direction with the gap 60 therebetween. That is, the rotor teeth 62 of the first radially outer rotor core 56 are arranged so as to face the permanent magnets 68 of the second radially outer rotor core 58 in the axial direction with the gap 60 therebetween.

An exciting coil 70 that excites the permanent magnet non-excitation magnetic poles of the rotor teeth 62, 66 is placed in the gap 60, namely between the first radially outer rotor core 56 and the second radially outer rotor core 58 in the axial direction. The exciting coil 70 is formed by an electric wire such as a copper wire, and fills substantially the entire region of the gap 60. The exciting coil 70 is formed in an annular shape around the shaft 50, and is wound in a toroidal form. The exciting coil 70 is formed so as to have a substantially uniform axial thickness along the entire length in the radial direction. The exciting coil 70 is placed radially outward of the shaft 50, is placed radially inward of the second stator core 32, and faces the second stator core 32 in the radial direction.

The exciting coil 70 is fixed to the stator 14 (specifically, the second stator core 32 of the stator core 24). Fixing of the exciting coil 70 to the stator 14 is implemented by using a holding member 71. The holding member 71 is a clip member made of a resin etc. and having a U-shape section so as to be able to hold the annular exciting coil 70 from radially inside.

A plurality of the holding members 71 are provided in the circumferential direction around the shaft 50. Each of the plurality of holding members 71 is attached to the stator 14 while holding the exciting coil 70 by contacting the radially inner end face and the axial end faces of the exciting coil 70, whereby the exciting coil 70 is fixed to the stator 14. FIG. 5 shows the state where the exciting coil 70 is fixed to the stator 14 by the plurality of holding members 71 provided in the circumferential direction.

The exciting coil 70 may be fixed to the stator 14 by directly fixing the exciting coil 70 to the first to third stator Gores 30 to 34. Alternatively, fixing of the exciting coil 70 to the stator 14 may be implemented by, e.g., forming holes in the opposing axial end faces of the first and third stator cores 30, 34 or in the radially inner surface of the second stator core 32, and hanging the holding members 71 through the holes.

A lead wire 77 of the exciting coil 70 extends in the stator 14, specifically extends through the slot between the stator teeth 26 of the stator core 24 of the stator 14 in the axial direction and is extended to the outside as shown in FIG. 1, and is connected to a controller. The lead wire 77 is insulated from the stator coil 28 in the slot between the stator teeth 26. A direct current is supplied from the controller to the exciting coil 70. When the direct current is supplied to the exciting coil 70, magnetic flux is generated which extends through the radially inner side (the axis side) of the exciting coil 70 in the axial direction. The magnetic flux is generated in an amount corresponding to the direct current that is supplied to the exciting coil 70.

The shaft 50 is formed in a hollow shape. The shaft 50 has a large diameter cylindrical portion 72 having a relatively large diameter, and small diameter cylindrical portions 74, 76 having a relatively small diameter. The small diameter cylindrical portions 74, 76 are provided at both axial ends. The small diameter cylindrical portions 74, 76 of the shaft 50 are supported by the case 20 via the bearings 16, 18. The large diameter cylindrical portion 72 is provided in the center in the axial direction, and is interposed between the small diameter cylindrical portions 74, 76 at both axial ends. The first and second radially outer rotor cores 56, 58 are placed radially outward of the large diameter cylindrical portion 72 so as to be supported by the large diameter cylindrical portion 72, and are fixed to the radially outer surface of the large diameter cylindrical portion 72.

The rotor core 52 has a radially inner rotor core 80 that is placed radially inward of the shaft 50 so as to be supported by the shaft 50. The radially inner rotor core 80 is placed radially inward of the first radially outer rotor core 56 and the second radially outer rotor core 58 of the rotor core 52 and the exciting coil 70. A hollow space 82 is formed in the large diameter cylindrical portion 72 of the shaft 50. The radially inner rotor core 80 is accommodated in the hollow space 82 of the large diameter cylindrical portion 72, and is bonded and fixed to the radially inner surface of the large diameter cylindrical portion 72. The radially inner rotor core 80 is made of a material produced by compression molding a soft magnetic material, specifically insulation coated soft magnetic material powder. The radially inner rotor core 80 is made of a material having smaller iron loss than the shaft 50.

The radially inner rotor core 80 is divided in the circumferential direction, and is formed by a plurality (e.g., 6) of rotor core pieces 84 each formed in a sector shape as viewed in the axial direction. The division of the radially inner rotor core 80 in the circumferential direction is performed at regular intervals (equal angles) in the circumferential direction, and the rotor core pieces 84 have the same shape. The number of pieces into which the radially inner rotor core 80 is divided in the circumferential direction, namely the number of rotor core pieces 84, is the number of poles of the first and second radially outer rotor cores 56, 58 in the radially outer rotor core 54, or a divisor of the number of poles. For example, in the case where the number of poles is "12," the radially inner rotor core 80 is divided into "2," "3," "4," "6," or "12" pieces (in FIGS. 3 and 4, the radially inner rotor core 80 is divided into "6" pieces).

The division of the radially inner rotor core 80 in the circumferential direction is performed along the lines extending through the axis of the rotor 12 and the shaft 50 and the circumferential centers of at least two of the permanent magnets 64, 68 and the rotor teeth 62, 66 (that is, the permanent magnet excitation magnetic poles and the permanent magnet non-magnetization magnetic poles) which are alternately arranged in the circumferential direction in the first and second radially outer rotor cores 56, 58 of the rotor 12. That is, each plane including the plane that divides the radially inner rotor 80 in the circumferential direction extends through the axis of the rotor 12 and the shaft 50 and through the circumferential center of any of the permanent magnets 64, 68 and the rotor teeth 62, 66 (that is, the permanent magnet excitation magnetic poles and the permanent magnet non-magnetization magnetic poles).

The radially inner rotor core 80 has notch holes 86, 88 extending in the axial direction in its axial ends. The notch holes 86, 88 are provided at both axial ends. Each of the notch holes 86, 88 is formed in a tapered or stair-like shape so that its diameter decreases from the axial end face toward the axial center. The diameter at the axial end (the shallowest portion) of the notch hole 86, 88 substantially matches the inner diameter of the large diameter cylindrical portion 72 of the shaft 50, and the diameter in the axial central portion (the deepest portion) of the notch hole 86, 88 is a predetermined diameter. The radially inner rotor core 80 has a predetermined radial thickness in the axial central portion, and has a smaller radial thickness at both axial ends than in the axial central portion. The radial thickness of the large diameter cylindrical portion 72 of the shaft 50 is set so as to maintain the strength required to transfer motor torque, and the radial thickness of the axial central portion of the radially inner rotor core 80 is set to the predetermined thickness with which the magnetic flux generated by the exciting coil 70 is not saturated. Thus, the radial thickness of the axial central portion of the radially inner rotor core 80 is larger than that of the large diameter cylindrical portion 72 of the shaft 50.

The notch hole 86 and the notch hole 88 communicate with each other in the center in the axial direction, and are connected together at their deepest portions through a through hole 89 extending through the rotor core 80 in the axial direction. That is, the radially inner rotor core 80 is formed in a hollow shape so as to have the through hole 89. All of the notch holes 86, 88 and the through hole 89 of the radially inner rotor core 80 are provided on the axis line of the shaft 50. The through hole 89 of the radially inner rotor core 80 has substantially the same diameter as the deepest portions of the notch holes 86, 88.

The rotor 12 is divided into two portions in the axial direction. The shaft 50 is divided into two portions in the axial direction, and is formed by two cup-shaped members 90, 92 that are fitted together. The shaft 50 is divided in the axial direction substantially along the center in the axial direction. The cup-shaped member 90 has the small diameter cylindrical portion 74 and a part of the large diameter cylindrical portion 72 (specifically, a half connected to the small diameter cylindrical portion 74). The cup-shaped member 92 has the small diameter cylindrical portion 76 and a part of the large diameter cylindrical portion 72 (specifically, a half connected to the small diameter cylindrical portion 76). The shaft 50 is formed by fitting the cup-shaped member 90 and the cup-shaped member 92 together. The first radially outer rotor core 56 is supported by the cup-shaped member 90, and the second radially outer rotor core 58 is supported by the cup-shaped member 92. The first radially outer rotor core 56 is fixed to the radially outer surface of the cup-shaped member 90, and the second radially outer rotor core 58 is fixed to the radially outer surface of the cup-shaped member 92.

Bolt holes 94, 96 extending in the axial direction on the axis are formed in the cup-shaped members 90, 92, respectively. The bolt holes 94, 96 have substantially the same diameter as the through hole 89 of the radially inner rotor core 80. A bolt 98 is inserted in the bolt holes 94, 96 of the cup-shaped members 90, 92 and the through hole 89 of the radially inner rotor core 80. The cup-shaped member 90 and the cup-shaped member 92 are fitted together, and are fastened together by the bolt 98.

The radially inner rotor core 80 may be divided into two portions in the axial direction. In this case, the radially inner rotor core 80 may be divided in the axial direction at a position corresponding to the position where the shaft 50 is divided in the axial direction, or substantially along the center in the axial direction. One of the divided two portions of the radially inner rotor core 80 is bonded and fixed to the radially inner surface of the cup-shaped member 90 of the shaft 50, and the other divided portion of the radially inner rotor core 80 is bonded and fixed to the radially inner surface of the cup-shaped member 92.

If a direct current is supplied to the annular exciting coil 70 in the above structure of the hybrid excitation rotating electrical machine 10, magnetic flux is generated which extends through the radially inner side (the axis side) of the exciting coil 70 in the axial direction. The magnetic flux generated by the electromagnet using the exciting coil 70 flows through the permanent magnet non-excitation magnetic poles of the first or second radially outer rotor core 56, 58, the radially inner rotor core 80, the permanent magnet non-excitation magnetic poles of the second or first radially outer rotor core 58, 56, the air gap 22, the stator core 24, the air gap 22, and the permanent magnet non-excitation magnetic poles of the first or second radially outer rotor core 56, 58. If such magnetic flux is generated, the permanent magnet non-excitation magnetic poles of the first and second radially outer rotor cores 56, 58 are excited. The magnetic flux thus generated by the electromagnet weakens or strengthens the magnetic flux generated by the permanent magnets 64, 68. The amount of magnetic flux generated by the electromagnet is adjusted according to the magnitude of the direct current that is applied to the exciting coil 70.

Thus, according to the present embodiment, torque that rotates the rotor 12 about the stator 14 can be adjusted by the combined magnetic flux of the magnetic flux generated by the permanent magnets 64, 68 and the magnetic flux generated by the electromagnet using the exciting coil 70, whereby the rotor 12 can be appropriately rotated.

In the hybrid excitation rotating electrical machine 10 of the present embodiment, the exciting coil 70 is fixed to the stator 14. Accordingly, it is not necessary to provide the exciting coil 70 with reinforcement etc. against centrifugal force associated with rotation of the rotor, and also it is not necessary to mount a slip ring to extend an external electric wire from the exciting coil 70. This can avoid reduction in mounting space for the exciting coil 70 itself, and can maximize the mounting space or can avoid an increase in device size of the rotating electrical machine 10 itself.

The exciting coil 70 is fixed to the stator 14, and is placed in the gap 60 extending in the axial direction between the first radially outer rotor core 56 and the second radially outer rotor core 58 of the rotor 12. As described above, this gap 60 is formed so as to have substantially the same size from the radially inner parts of the first and second radially outer rotor cores 56, 58 to the radially outer parts thereof, namely substantially the same size along the entire length in the radial direction. The exciting coil 70 is formed so as to have a substantially uniform axial thickness along the entire length in the radial direction. The exciting coil 70 is positioned and formed so as to overlap the first radially outer rotor core 56 and the second radially outer rotor core 58 in the radial direction as viewed in the axial direction, and so as not to overlap the first radially outer rotor core 56 and the second radially outer rotor core 58 in the axial direction as viewed in the radial direction. The exciting coil 70 is positioned and formed so that both axial ends of the exciting coil 70 are located in the gap 60 between the first radially outer rotor core 56 and the second radially outer rotor core 58 in the axial direction.

That is, the exciting coil 70 is positioned and formed so that the radially inner end of the exciting coil 70 is located closer to the axis than the radially outer ends of the first radially outer rotor core 56 and the second radially outer rotor core 58 are in the radial direction, and so that the surfaces of the exciting coil 70, which face the rotor 12 in the gap 60 between the first radially outer rotor core 56 and the second radially outer rotor core 58, are the surface facing radially inward (i.e., the surface facing toward the axis and facing the radially outer surface of the shaft 50) and the surfaces facing in the axial direction (i.e., the surfaces facing the radially outer rotor cores 56, 58). However, the surfaces of the exciting coil 70 which face the rotor 12 do not include the surface of the exciting coil 70 which faces radially outward, and no component of the rotor 12 is present radially outward of the exciting coil 70.

The axial end of the radially outer end of the first radially outer rotor core 56, which is located on the second radially outer rotor core 58 side, and the second radially outer rotor core 58 are positioned on opposite sides in the axial direction of the axial end of the exciting coil 70, which is located on the first radially outer rotor core 56 side. The axial end of the radially outer end of the second radially outer rotor core 58, which is located on the first radially outer rotor core 56 side, and the first radially outer rotor core 56 are positioned on opposite sides in the axial direction of the axial end of the exciting coil 70, which is located on the second radially outer rotor core 58 side.

The first stator core 30 and the third stator core 34, which are provided on both sides in the axial direction of the stator 14, face the first radially outer rotor core 56 and the second radially outer rotor core 58 in the radial direction with the air gap 22 therebetween. The second stator core 32, which is provided in the center in the axial direction of the stator 14, adjoins and faces the exciting coil 70 in the radial direction. In this regard, the exciting coil 70 is provided so as to be fixed to the stator 14, and so as to protrude inward in the radial direction (that is, toward the axis) from the main body of the stator core 24 and to be inserted in the gap 60 between the first radially outer rotor core 56 and the second radially outer rotor core 58, which is located radially outward of the shaft 50.

In this structure, the gap in the radial direction between the rotor 12, the stator 14, and the exciting coil 70 is only the gap between the radially inner surface of the exciting coil 70 and the rotor 12. Accordingly, unlike the structure in which the exciting coil fixed to the stator 14 is placed in the inner part of the rotor 12, the gap in the radial direction between the rotor 12, the stator 14, and the exciting coil 70, can be minimized. This can also avoid reduction in mounting space for the exciting coil 70 itself, and can maximize the mounting space or can avoid an increase in device size of the rotating electrical machine 10 itself.

The exciting coil 70 fixed to the stator 14 is placed radially inward of the stator core 24, namely placed closer to the axis with respect to the main body of the stator core 24. This allows a large space for placing the second stator core 32 of the stator core 24 to be secured on the radially outer side of the exciting coil 70, and thus can increase the radial width of the stator core 24 that can serve as a magnetic path in the region radially outward of the exciting coil 70. Since a large space can be ensured on the radially outer side as a mounting space for the exciting coil 70, it is not necessary to increase the axial length of the exciting coil 70 in order to form a desired magnetic circuit, and an increase in overall axial length of the rotating electrical machine 10 itself can be prevented.

The exciting coil 70 is placed in a radially outer region of the rotor core 52. Specifically, the exciting coil 70 is placed and formed so that the radial position of the radially outer end of the exciting coil 70 overlaps a region corresponding to the radial position of the air gap 22 between the first and/or second radially outer rotor core 56, 58 of the rotor 12 and the first and/or third stator core 30, 34 of the stator 14.

This allows a large space to be secured in a region radially inward of the exciting coil 70, whereby a large sectional area of the magnetic path or a large sectional area of the shaft 50 can be obtained in the region radially inward of the exciting coil 70. The mounting space for the exciting coil 70 can be extended to the region corresponding to the radial position of the air gap 22 between the first and/or second radially outer rotor core 56, 58 of the rotor 12 and the first and/or third stator core 30, 34 of the stator 14, and a large space can be secured on the radially inner side of the region corresponding to the air gap 22 as a mounting space for the exciting coil 70. Thus, it is not necessary to increase the axial length of the exciting coil 70 in order to form a desired magnetic circuit, and an increase in overall axial length of the rotating electrical machine 10 itself can be prevented.

Thus, the structure of the present embodiment can suppress concentration of the magnetic flux flowing in the axial direction in the stator core 24 and the rotor 12 on the radially outer and inner sides of the exciting coil 70, whereby a desired magnetic path can be effectively formed when a rotating magnetic field is generated by application of current to the stator coils 28 or when magnetic flux is generated by application of current to the exciting coil 70, and an increase in device size of the rotating electrical machine 10 itself can be avoided. Thus, according to the hybrid excitation rotating electrical machine 10 of the present embodiment, the exciting coil 70 that excites the permanent magnet non-excitation magnetic poles is placed at an appropriate position, whereby formation of a desired magnetic circuit can be implemented without increasing the size.

Thus, according to the present embodiment, torque that rotates the rotor 12 can be efficiently generated, and a torque increase upon rotating the rotor 12 can be implemented. This can suppress an increase in size of the device itself in order to generate large torque. Thus, desired torque performance can be achieved even if ferrite magnets having relatively small magnetic force are used as the permanent magnets 64, 68. This can eliminate the need to use, e.g., a neodymium magnet having relatively large magnetic force, while achieving desired torque performance.

In the present embodiment, the lead wire 77 of the exciting coil 70 extends through the slot between the stator teeth 26 of the stator core 24 of the stator 14 in the axial direction and is extended to the outside. Thus, it is not necessary to form a through hole in the stator 14 itself in order to extend the lead wire 77 to the outside, and it is not necessary to attach to the stator 14 itself a member dedicated to extend the lead wire 77 to the outside, etc. This can facilitate placement of the lead wire 77, and can avoid an increase in device size of the rotating electrical machine 10 itself.

In the first embodiment described above, the permanent magnet excitation magnetic poles that are excited by the permanent magnets 64, 68 of the first and second radially outer rotor cores 56, 58 correspond to the "first magnetic poles" described in the claims, the permanent magnet non-excitation magnetic poles that are not excited by the permanent magnets 64, 68 correspond to the "second magnetic poles" described in the claims, and the first and second radially outer stator cores 56, 58 correspond to the "first stator core" and the "second stator core" described in the claims, respectively.

In the first embodiment described above, the lead wire 77 of the exciting coil 70 extends through the slot between the stator teeth 26 of the stator core 24 of the stator 14 in the axial direction and is extended to the outside. However, the present invention is not limited to, and the lead wire 77 may extend through any part in the stator 14, e.g., through the stator core 24 and may be extended to the outside.

Second Embodiment

Figure 7:
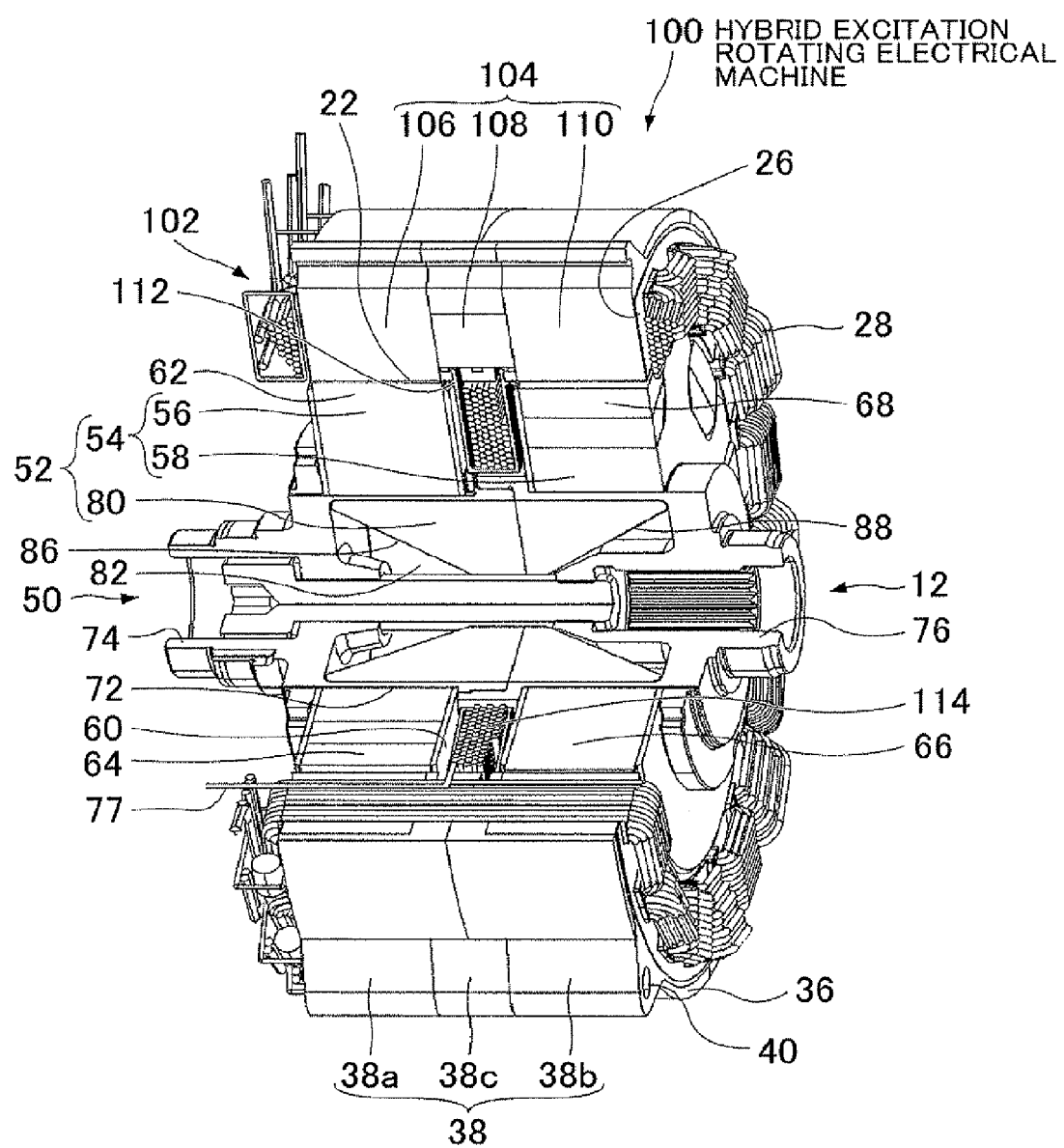
FIG. 7 is a perspective view showing the structure of a hybrid excitation rotating electrical machine according to a second embodiment of the present invention.
Figure 8:
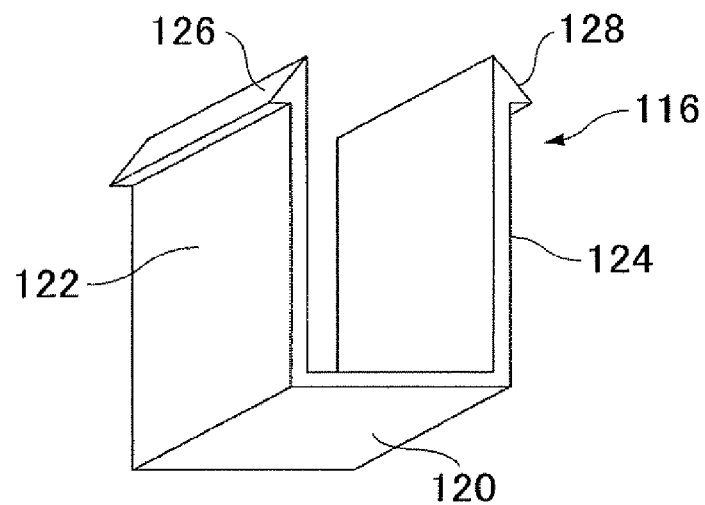
FIG. 8 is a perspective view of a holding member that forms the hybrid excitation rotating electrical machine according to the second embodiment of the present invention.
Figure 9:
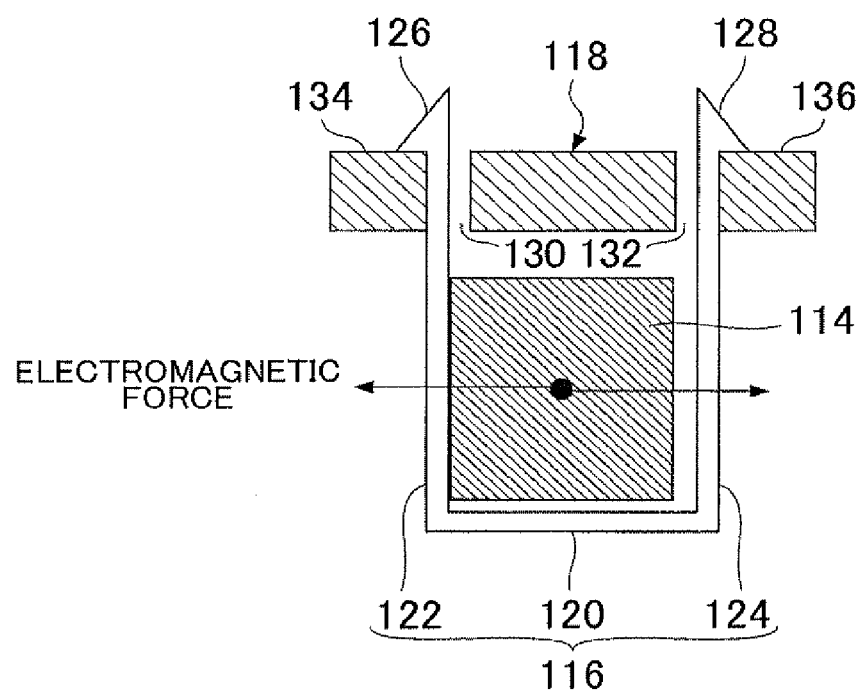
FIG. 9 is a sectional view of a main part of the hybrid excitation rotating electrical machine according to the second embodiment of the present invention.

FIG. 7 is a perspective view showing the structure of a hybrid excitation rotating electrical machine 100 according to a second embodiment of the present invention. The hybrid excitation rotating electrical machine 100 is shown partially cutaway in FIG. 7. In FIG. 7, the same portions as those in the configuration shown in FIG. 1 are denoted by the same reference characters, and description thereof will be omitted or simplified. FIG. 8 is a perspective view of a holding member that forms the hybrid excitation rotating electrical machine 100 according to the present embodiment. FIG. 9 is a sectional view of a main part of the hybrid excitation rotating electrical machine 100 according to the present embodiment. FIG. 10 is a diagram showing an attachment member forming the hybrid excitation rotating electrical machine 100 according to the second embodiment as viewed from the side of the axis.

In the present embodiment, the hybrid excitation rotating electrical machine 100 includes a stator 102 that generates a rotating magnetic field rotating a rotor 12. Like the stator 14 of the first embodiment described above, the stator 102 is placed radially outward of the rotor 12, and faces the rotor 12 in the radial direction with an air gap 22 therebetween. The stator 102 includes a hollow cylindrical stator core 104, and stator coils 28 that are wound around stator teeth 26 protruding toward the axis in the radially inner surface of the stator core 104.

The stator core 104 is divided in the axial direction, and has a first stator core 106, a second stator core 108, and a third stator core 110. The first to third stator cores 106 to 110 are arranged in the axial direction. The first and third stator cores 106, 110 are placed at both axial ends. The second stator core 108 is placed in the center in the axial direction, and is interposed between the first stator core 106 and the third stator core 110 in the axial direction. The stator core 104 is thus divided in the axial direction into the second stator core 108 located in the center in the axial direction and the first and third stator cores 106, 110 located on both sides of the second stator core 108 in the axial direction.

The first to third stator cores 106 to 110 are formed in a hollow cylindrical shape, and have substantially the same outer diameter, but have different inner diameters from each other. The first and third stator cores 106, 110 have substantially the same inner diameter, and as shown in FIG. 7, the second stator core 108 has a larger inner diameter than the first and third stator cores 106, 110. Thus, the stator core 104 has a groove 112 formed radially inward of the second stator core 108 and having a thickness corresponding to the difference between the inner diameter of the second stator core 108 and the inner diameter of the first and third stator cores 106, 110. The groove 112 faces the radially outer side of a gap 60 between a first radially outer rotor core 56 and a second radially outer rotor core 58.

Each of the first to third stator cores 106 to 110 is formed by a back yoke portion formed in an annular shape, and a stator teeth portion protruding from the radially inner surface of the back yoke portion toward the axis. In each of the first to third stator cores 106 to 110, the back yoke portion is formed integrally with the stator teeth portion. In each of the first to third stator cores 106 to 110, the back yoke portion and the stator teeth portion may be provided as separate members. The groove 112 is provided radially inward of the stator teeth portion of the second stator core 108.

The stator teeth portions of the first to third stator cores 106 to 110 are provided so as to be arranged next to each other in the axial direction, and together form each stator tooth 26. The stator coil 28 is wound around each stator tooth 26, and each stator coil 28 is formed so as to extend through the first to third stator cores 106 to 110 in the axial direction in a slot between the stator teeth 26 located next to each other in the circumferential direction.

Each of the first and third stator cores 106, 110 is an electromagnetic steel plate core formed by stacking a plurality of insulation coated electromagnetic steel plates in the axial direction. The second stator core 108 is a dust core made of a soft magnetic material such as iron, specifically a material produced by compression molding insulation coated soft magnetic material powder. The magnetic resistance in the axial direction of the second stator core 108 is lower than that in the axial direction of the first and third stator cores 106, 110.

A thin cylindrical yoke 36 is provided radially outward of the stator core 104. The yoke 36 is formed so as to cover the entire outer peripheries of the first to third stator cores 106 to 110, and supports the first to third stator cores 106 to 110. Like the second stator core 108, the yoke 36 is a dust core made of a material produced by compression molding insulation coated soft magnetic material powder. The magnetic resistance in the axial direction of the yoke 36 is lower than that in the axial direction of the first and third stator cores 106, 110. The yoke 36 may be fanned integrally with the second stator core 108. The yoke 36 is bonded and fixed to the radially outer surfaces of the first stator core 106 and the third stator core 110. The first stator core 106 and the third stator core 110 are magnetically coupled together via the yoke 36 and the second stator core 108.

The stator core 104 has an attachment portion 38 that protrudes outward in the radial direction and that attaches and fixes the stator 102 to the case 20. The attachment portion 38 has an attachment portion 38a formed integrally with the first stator core 106, an attachment portion 38b formed integrally with the third stator core 110, and an attachment portion 38c interposed between the attachment portions 38a, 38b. The attachment portion 38c is placed radially outward of the second stator core 108. The attachment portion 38c may be formed integrally with the second stator core 108 instead of being formed by a plurality of electromagnetic steel plates that are stacked in the axial direction.

An exciting coil 114 that excites permanent magnet non-excitation magnetic poles of rotor teeth 62, 66 is placed in the gap 60 formed between the first radially outer rotor core 56 and the second radially outer rotor core 58 in the axial direction. The exciting coil 114 is formed by a conducting wire such as a copper wire, and fills substantially the entire region of the gap 60. The exciting coil 114 is formed in an annular shape around a shaft 50, and is wound in a toroidal form. The exciting coil 114 is formed so as to have a substantially uniform axial thickness along the entire length in the radial direction. The exciting coil 114 is placed radially outward of the shaft 50, is placed radially inward of the second stator core 108, and faces the second stator core 108 in the radial direction.

A lead wire 77 of the exciting coil 114 extends in the stator 102, specifically extends through the slot between the stator teeth 26 of the stator core 104 of the stator 102 in the axial direction and is extended to the outside as shown in FIG. 7, and is connected to a controller. A direct current is supplied from the controller to the exciting coil 114. When the direct current is supplied to the exciting coil 114, magnetic flux is generated which extends through the radially inner side (the axis side) of the exciting coil 114 in the axial direction. The magnetic flux is generated in an amount corresponding to the direct current that is supplied to the exciting coil 114.

The exciting coil 114 is fixed to the stator 102 (specifically, the second stator core 108 of the stator core 104). Fixing of the exciting coil 114 to the stator 102 is implemented by using a holding member 116 and an attachment member 118. The holding member 116 is a clip member made of a resin etc. and having a U-shape section so as to be able to hold the annular exciting coil 114 from radially inside. A plurality (e.g., 12 or 18; preferably the number of holding members 116 is the same as that of stator teeth 26) of the holding members 116 are provided in the circumferential direction around the shaft 50.

Each holding member 116 has a bottom 120 and support portions 122, 124 formed in a forked manner with the bottom 120 interposed therebetween. Each holding member 116 is placed so that the bottom 120 is located on the side of the axis and that the support portions 122, 124 extend outward in the radial direction and face each other in the axial direction at a predetermined distance therebetween. in each holding member 116, the bottom 120 contacts the radially inner end face of the exciting coil 114, and the support portions 122, 124 contact the axial end faces of the exciting coil 114, thereby holding the exciting coil 114.

The width (i.e., the length in the axial direction in which the rotor 12 and the shaft 50 extend) of the bottom 120 of the holding member 116 and the height (i.e., the length of the radial direction of the rotor 12 and the shaft 50) of the support portion 122, 124 are predetermined based on the thickness of the conducting wire and the number of turns of the exciting coil 114, etc. so as to obtain desired electromagnetic force. The holding member 116 is elastic so that the separation distance in the axial direction between the support portions 122, 124 is varied. The support portion 122, 124 is hardly displaced in the axial direction at its connection portion with the bottom 120, but is displaceable to an increasingly larger extent in the axial direction toward its tip end.

The support portion 122, 124 has a pawl portion 126, 128 that fixes the holding member 116 to the stator 102. The pawl portion 126, 128 is provided at the tip end of the support portion 122, 124. The pawl portion 126 of the support portion 122 and the pawl portion 128 of the support portion 124 protrude outward in the axial direction away from each other (toward the opposite sides in the axial direction).

The attachment member 118 is a member made of a resin etc. and formed so as to match the shape of the groove 112 formed in the stator core 104. The number of attachment members 118 may be the same as that of holding members 116, or the attachment member 118 may be formed in an annular shape so as to cover the groove 112. The attachment member 118 is fixed and placed so as to fit in the groove 112 formed radially inward of the second stator core 108. The attachment member 118 is fixed to the radially inner surface of the stator teeth portion of the second stator core 108 or to the axial end faces of the first and third stator cores 106, 110 by bonding etc.

When the attachment member 118 is fixed to the stator 102, a space is formed between the radially outer surface of the attachment member 118 and the radially inner surface of the second stator core 108 so that at least the tip ends (specifically the pawl portions 126, 128) of the support portions 122, 124 of the holding member 116 can enter the space. The holding member 116 is attached to the attachment member 118. The attachment member 118 has two insertion holes 130, 132 in which the support portions 122, 124 of the holding member 116 are inserted, respectively, and seat portions 134, 136 which adjoin the insertion holes 130, 132 and with which the pawl portions 126, 128 are engaged, respectively.

Each insertion hole 130, 132 is sized so that the entire pawl portion 126, 128 at the tip end of the support portion 122, 124 of the holding member 116 can be inserted into the insertion hole 130, 132. Each insertion hole 130, 132 is formed so as to have a substantially uniform size along its entire length in the radial direction. The separation distance between the insertion holes 130, 132 formed in the attachment member 118 is set to be slightly smaller than that between the support portions 122, 124 of the holding member 116 in a normal state.

FIG. 11A and FIG. 11B show sectional views of a main part of a comparative example, illustrating effects of the hybrid excitation rotating electrical machine 100 according to the present embodiment. FIG. 11A shows the state before generation of electromagnetic force, and FIG. 11B shows the state after generation of electromagnetic force.

The structure of the present embodiment is substantially the same as that of the first embodiment. Thus, according to the hybrid excitation rotating electrical machine 100 of the present embodiment, substantially the same effects as those of the hybrid excitation rotating electrical machine 10 of the first embodiment can be obtained.

In the structure of the present embodiment, in order to fix to the stator 102 the exciting coil 114 that is placed in the gap 60 between the first stator core 106 and the third stator core 110, the attachment member 118 is first fixed and placed so as to fit in the groove 112 located radially inward of the second stator core 108, and the exciting coil 114 is then placed radially inward of the attachment member 118.

The support portions 122, 124 of the holding member 116 are inserted into the insertion holes 130, 132 of the attachment member 118, and then the pawl portions 126, 128 of the support portions 122, 124 are engaged with the seat portions 134, 136, whereby the holding member 116 is attached to the attachment member 118. In this case, the bottom 120 and the support portions 122, 124 contact the exciting coil 114, whereby the holding member 116 holds the exciting coil 114, and the exciting coil 114 is fixed to the stator 102.

Thus, according to the structure of the hybrid excitation rotating electrical machine 100 of the present embodiment, the exciting coil 114 that excites the permanent magnet non-excitation magnetic poles of the rotor teeth 62, 66 can be appropriately placed at an appropriate position and fixed to the stator 102. Therefore, according to the present embodiment, performance that excites the permanent magnet non-excitation magnetic poles provided in the rotor teeth 62, 66 of the hybrid excitation rotating electrical machine 100 can be enhanced to desired performance.

Moreover, in the present embodiment, the holding member 116 as a clip member that fixes the exciting coil 114 to the stator 102 has the support portions 122, 124 formed in a forked manner so as to have the pawl portions 126, 128 at their tip ends, respectively. These pawl portions 126, 128 protrude outward in the axial direction away from each other. The attachment member 118 to which the holding member 116 is attached has the insertion holes 130, 132 in which the support portions 122, 124 of the holding member 116 are inserted. The separation distance between these insertion holes 130, 132 is set to be slightly smaller than that between the support portions 122, 124 of the holding member 116 in a normal state.

In this structure, in the process of fixing the exciting coil 114 to the stator 102, the tip ends of the support portions 122, 124 of the holding member 116 are inserted into the insertion holes 130, 132 of the attachment member 118 while making the separation distance between the tip ends of the support portions 122, 124 smaller than in the normal state. After the insertion, when the separation distance between the tip ends of the support portions 122, 124 of the holding member 116 is being returned to the normal state, the support portions 122, 124 contact the inner surfaces of the insertion holes 130, 132 of the attachment member 116, and the pawl portions 126, 128 of the support portions 122, 124 are engaged with the seat portions 134, 136 of the insertion holes 130, 132. When such a state is implemented, the holding member 116 is attached and fixed to the attachment member 118, and the exciting coil 114 is fixed to the stator 102.

As described above, according to the method of fixing the exciting coil 114 to the stator 102 in the present embodiment, even if axially outward electromagnetic force (shown by arrows in FIG. 9) is generated in the exciting coil 114 after the fixing when the permanent magnet non-excitation magnetic poles of the rotor teeth 62, 66 are excited by application of current to the exciting coil 114, the support portions 122, 124 of the holding member 116 is no longer displaced axially outward, and the pawl portions 126, 128 are not disengaged from the seat portions 134, 136 of the attachment member 118. Thus, attachment and fixing of the holding member 116 to the attachment member 118 is maintained.

On the other hand, as shown in FIG. 11A and FIG. 11B, in the structure of the comparative example in which pawl portions 200, 202 at the tip ends of the support portions 122, 124 of the holding member 116 protrude inward in the axial direction toward each other, and the separation distance between the insertion holes 130, 132 is set to be slightly larger than that between the support portions 122, 124 of the holding member 116 in a normal state, the support portion 122 of the holding member 116 may be displaced outward in the axial direction and the pawl portion 200 may be disengaged from a seat portion 204 of the attachment member 118 as shown in FIG. 11B, in response to generation of the electromagnetic force described above (shown by arrow in FIG. 11B). Accordingly, attachment and fixing of the holding member 116 to the attachment member 118 may not be maintained.

Thus, according to the hybrid excitation rotating electrical machine 100 of the present embodiment, unlike the above comparative example, the pawl portions 126, 128 can be prevented from being disengaged from the seat portions 134, 136 of the attachment member 118 even in a situation where radially outward electromagnetic force is generated in the exciting coil 114. Thus, attachment and fixing of the holding member 116, which holds the exciting coil 114, to the attachment member 118 can be reliably ensured. Accordingly, desired performance that excites the permanent magnet non-excitation magnetic poles can be maintained even in the situation where radially outward electromagnetic force is generated in the exciting coil 114.

In the second embodiment described above, the first and third stator cores 106, 110 correspond to the "first end stator core" and the "second end stator core" described in the claims, respectively, the second stator core 108 corresponds to the "central stator core" described in the claims, the holding member 116 corresponds to the "coil holding member" described in the claims, and the attachment member 118 corresponds to the "fixing attachment member" described claims.

In the second embodiment, each of the insertion holes 130, 132 provided in the attachment member 118 is formed so as to have a substantially uniform size along the entire length in the radial direction. However, the present invention is not limited to this, and the insertion hole 130, 132 may be formed so that its size is varied along the length in the radial direction.

Figure 12:
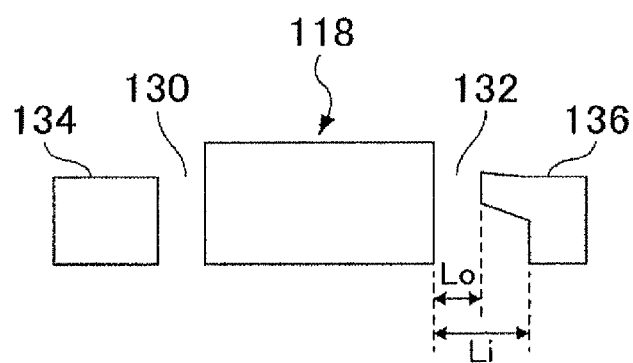
FIG. 12 is a sectional view of an attachment member forming a hybrid excitation rotating electrical machine according to a modification of the present invention.

Specifically, at least one of the insertion holes 130, 132 (only the insertion hole 132 in FIG. 12 and FIG. 13A) is formed so that its size Li on the inlet side (on the radially inner side) where the support portion 122, 124 of the holding member 116 is inserted is larger than its size Lo on the outlet side (on the radially outer side) in the axial direction in which the pawl portions 126, 128 that are inserted into the insertion holes 130, 132 protrude. That is, at least one of the insertion holes 130, 132 is formed so that the axially inner end on the inlet side is located at the same axial position as the axially inner end on the outlet side, and that the axially outer end on the inlet side is located axially outward of the axially outer end on the outlet side. The distance between the axially outer end of the insertion hole 130 and the axially outer end of the insertion hole 132 in the axial direction is smaller on the outlet side (distance Xo) than on the inlet side (distance Xi) (Xi>Xo).

In order to attach the holding member 116 to the attachment member 118, the separation distance between the tip ends of the support portions 122, 124 of the holding member 116 need be made smaller than in the normal state. However, in the structure of this modification, this separation distance need not be made smaller than in the normal state until immediately before the pawl portions 126, 128 at the tip ends of the support portions 122, 124 pass the inlet of the attachment member 118 and reach the outlet thereof. This separation distance need only be made smaller than in the normal state immediately before the pawl portions 126, 128 reach the outlet of the attachment member 118.

Figure 13:
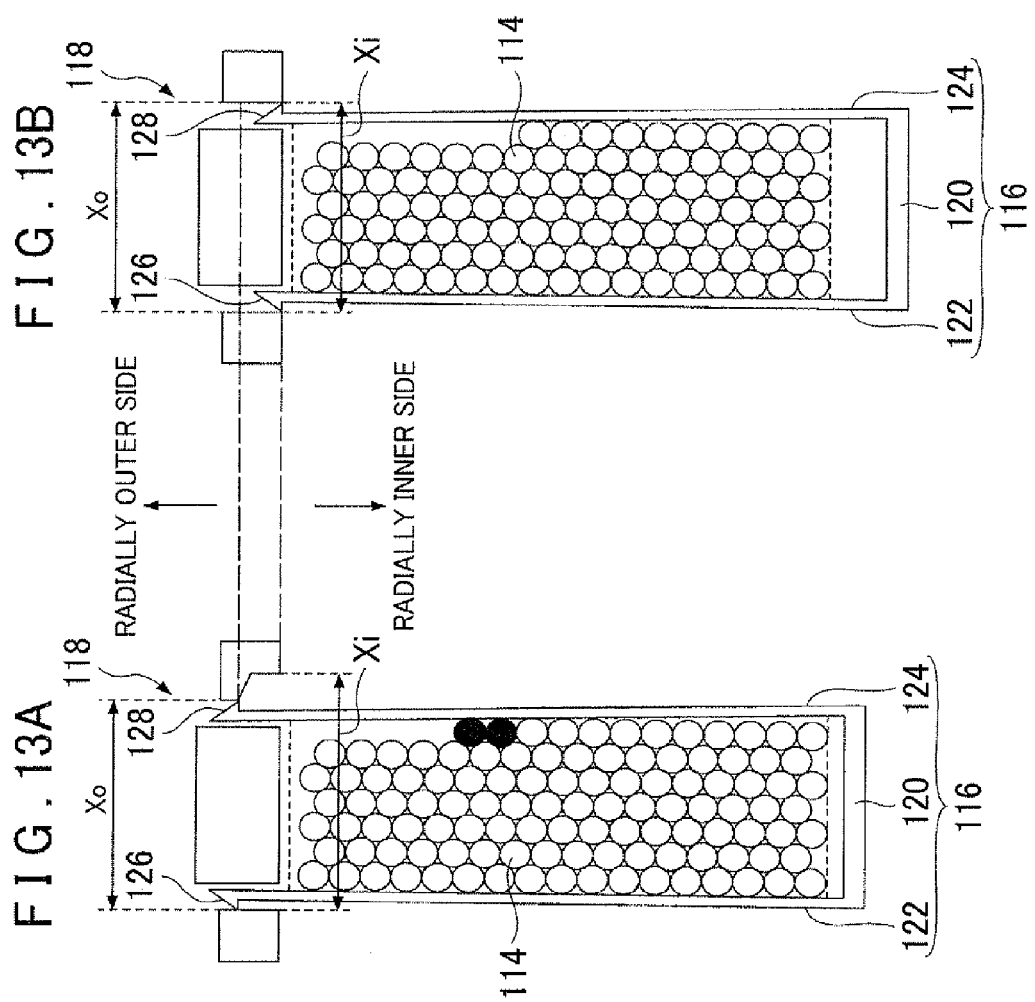
FIG. 13A and FIG. 13B show diagrams illustrating effects of the hybrid excitation rotating electrical machine according to the modification of the present invention.

According to the structure of the modification as shown in FIG. 13A, the position of the holding member 116 at the timing of starting to reduce the separation distance between the tip ends of the support portions 122, 124 of the holding member 116 can be located further radially outward (outer diameter side), and the bottom 120 of the holding member 116 can be located closer to the radially inner surface of the exciting coil 114, when attaching the holding member 116 to the attachment member 118, as compared to the structure of the comparative example (Xi=Xo) in which each of the insertion holes 130, 132 is formed so as to have a substantially uniform size along the entire length in the radial direction as shown in FIG. 13B.

In the case where the separation distance between the tip ends of the support portions 122, 124 of the holding member 116 need be reduced, the number of turns of the exciting coil 114 which can be accommodated in the holding member 116 is limited as compared to the case where the separation distance need be reduced. For example, in the case where the separation distance need be reduced, even if a predetermined maximum number of turns (7 turns in FIG. 13A and FIG. 13B) of the exciting coil 114 can be arranged in the axial direction in the holding member 116, a smaller number of turns than the predetermined maximum number of turns (6 turns in FIG. 13A and FIG. 13B) of the exciting coil 114 may be arranged in the axial direction in a region of the holding member 116 which is close to the tip ends of the support portions 122, 124. The position where the number of turns of the exciting coil 114 which can be arranged in the axial direction in the holding member 116 changes from the predetermined maximum number of turns is located at an invariable distance as viewed from the tip ends of the support portions 122, 124. However, the more the position of the holding member 116 at the timing of starting to reduce the separation distance is located radially outward, the closer the position where the number of turns of the exciting coil 114 which can be arranged in the axial direction in the holding member 116 changes from the predetermined maximum number of turns is located to the attachment member 118 in the radially outward direction.

Thus, according to the modification shown in FIG. 13A, the number of turns of the exciting coil 114 which can be accommodated in the holding member 116 can be increased by a predetermined number of turns (e.g., 2 turns shown by black circles in FIG. 13A), as compared to the comparative example shown in FIG. 13B. Thus, the permanent magnet non-excitation magnetic poles can be efficiently excited by the exciting coil 114. Moreover, the space in the holding member 116 accommodating the exciting coil 114 can be effectively used to a maximum extent, and a compact holding member 116 can be implemented.

Figure 14:
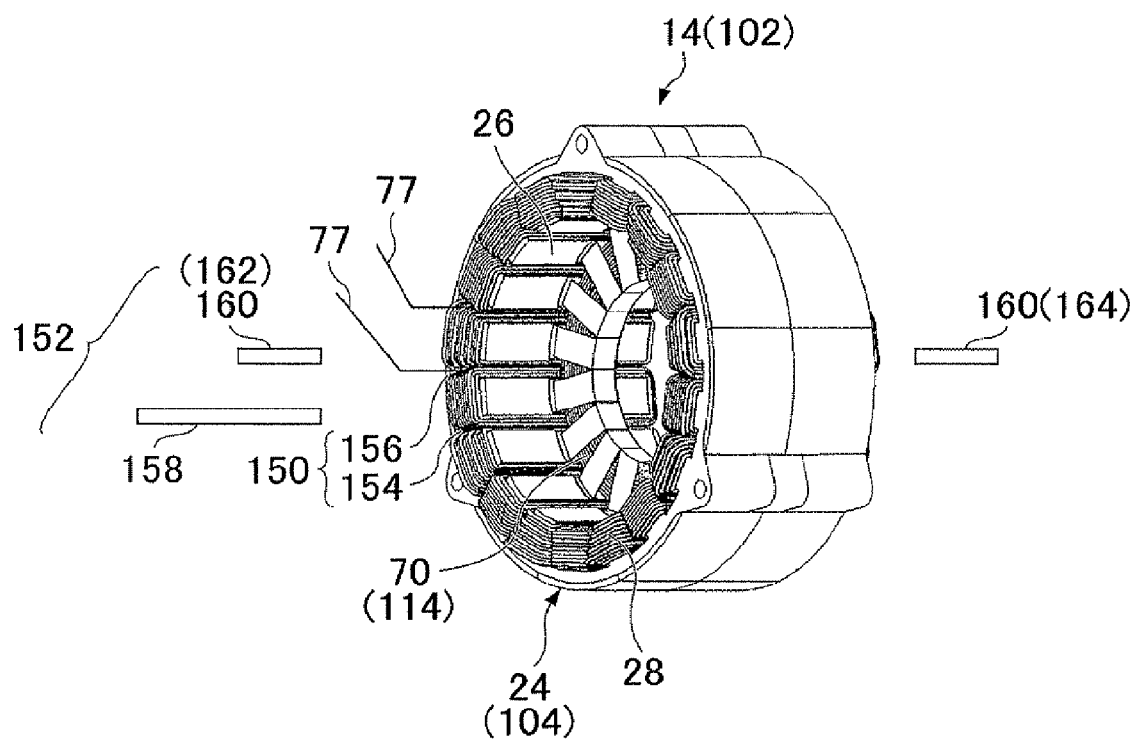
FIG. 14 is a perspective view showing the structure of the hybrid excitation rotating electrical machine according to the modification of the present invention.

In the first and second embodiments, the lead wire 77 of the exciting coil 70, 114 extends in the stator 14, 102, specifically extends through the slot between the stator teeth 26 of the stator core 24, 104 of the stator 14, 102 in the axial direction, and is extended to the outside. As shown in FIG. 14, the stator cores 24, 104 of the stators 14, 102 have a wedge 152 provided on the radially innermost side of a slot 150 between the stator teeth 26. The wedge 152 is provided for each slot 150 between the stator teeth 26 so as to cover the slot 150 from radially inside. Each wedge 152 is formed so as to extend in the axial direction of the rotor 12 and to be thin in the radial direction. Each wedge 152 is made of, e.g., insulating paper, a resin, etc. The wedge 152 has a function to prevent the stator coils 28 wound around the stator teeth 26 from moving inward in the radial direction from the slot 150 and coming off from the slot 150.

The plurality of slots 150 arranged in the circumferential direction are formed by a slot (hereinafter referred to as the "non-lead-wire slot") 154 through which no lead wire 77 of the exciting coil 70, 114 extends, and a slot (hereinafter referred to as the "lead-wire slot") 156 through which the lead wire 77 of the exciting coil 70, 114 extends. The lead wire slot 156 is one or two of all the slots 150 (FIG. 14 shows the state where two lead-wires slots 150 are provided.

Figures 16A, 16B:
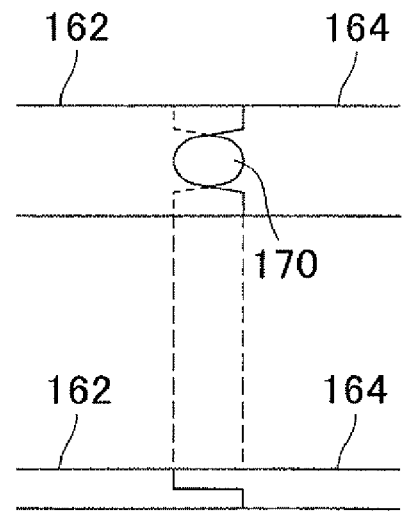
FIG. 16A and FIG. 16B show diagrams showing the state after attachment of the lead wire wedge divided into two pieces, in the hybrid excitation rotating electrical machine according to the modification of the present invention.

The plurality of wedges 152 arranged in the circumferential direction is formed by a wedge (hereinafter referred to as the "non-lead-wire wedge") 158 corresponding to the non-lead-wire slot 154, and a wedge (hereinafter referred to as the "lead-wire wedge") 160 corresponding to the lead-wire slot 156. The non-lead-wire wedge 158 has a one-piece structure having substantially the same axial length as the stator teeth 26. On the other hand, the lead-wire wedge 160 has a two-piece structure in which the lead-wire wedge 160 is divided into two pieces substantially along the center in the axial direction. The lead-wire wedge 162 is formed by a first piece 162 and a second piece 164. Both the first and second pieces 162, 164 have substantially about a half of the axial length of the stator teeth 26. The first piece 162 is attached between the two stator teeth 26 by insertion from one end of the lead-wire slot 156, and the second piece 164 is attached between the two stator teeth 26 by insertion from the other end of the lead-wire slot 156. The first piece 162 and the second piece 164 are configured so as to slightly overlap each other in the axial direction when attached between the two stator teeth 26, as shown in FIG. 16B.

Figure 15:
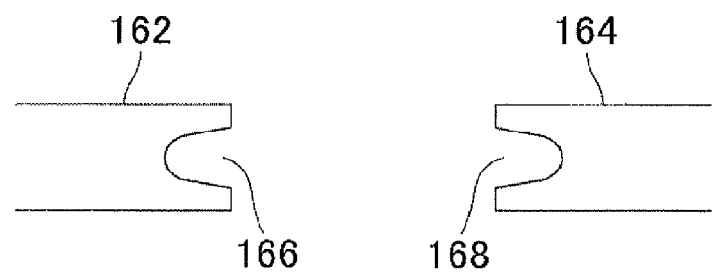
FIG. 15 is a diagram showing the state before attachment of a lead wire wedge divided into two pieces, in the hybrid excitation rotating electrical machine according to the modification of the present invention.

As shown in FIG. 15, cutout portions 166, 168 are provided in axial ends of the first and second pieces 162, 164 which face each other. Each of the cutout portions 166, 168 is formed in, e.g., a U-shape, an elliptical shape, or a semicircular shape so as to open in the axial direction. As shown in FIG. 16A, when the pieces 162, 164 are inserted into the lead-wire slot 156 and attached between the two stator teeth 26, a through hole 170 that opens in a substantially annular shape in the radial direction is formed substantially in the center in the axial direction of the lead-wire wedge 160 by the cutout portion 166 of the first piece 162 and the cutout portion 168 of the second piece 165. This through hole 170 is a hole that provides communication between the lead-wire slot 156 and a space where the exciting coil 70, 114 is placed, which are separated from each other in the radial direction by the lead-wire wedge 160. The through hole 170 is formed so as to be large enough for the lead wire 77 of the exciting coil 70, 114 to extend therethrough. The lead wire 77 of the exciting coil 70, 114 is extended to the lead-wire slot 156 via the through hole 170, and is connected to an external controller. The lead-wire wedge 160 may have any configuration in which the lead-wire wedge 160 is attached and mounted to the lead-wire slot 156 between the two stator teeth 26 after the exciting coil 70, 114 is fixed to the stator 14, 102.

According to this configuration, the wedge 152 can prevent the stator coil 28 wound around the stator tooth 26 from moving radially inward from the slot 150 and coming off from the slot 150, and can reliably extend the lead wire 77 of the exciting coil 70, 114 from the main body of the exciting coil 70, 114 to the lead-wire slot 156.

The exciting coil 70, 114 have two lead wires 77 based on the main body of the exciting coil 70, 114. These two lead wires 77 may extend in different slots 150 from each other as shown in FIG. 14, or may extend in the same slot 150. In the case where the two lead wires 77 extend in the same slot 150, these two lead wires 77 may extend either in the same axial direction or in different axial directions from each other from the through hole 170 in the same slot 150.

What is claimed is:

1. A hybrid excitation rotating electrical machine, comprising:
    a rotor having first and second rotor cores that are separated in an axial direction with a gap between the rotor cores, wherein first magnetic poles that are excited by a permanent magnet and second magnetic poles that are not excited by the permanent magnet are alternately arranged in a circumferential direction in each of the first and second rotor cores, the first magnetic poles of the first rotor core have a different polarity from that of the first magnetic poles of the second rotor core, and the first magnetic poles of one of the first and second rotor cores are placed so as to face the second magnetic poles of the other of the first and second rotor cores in the axial direction with the gap between the rotor cores;
a stator that is placed radially outward of the rotor with an air gap between the stator and the rotor, and that generates a rotating magnetic field rotating the rotor; and
an exciting coil that is fixed to the stator, that is placed in the gap so as to protrude radially inward from the stator, and that excites the second magnetic poles, wherein
an axial end of a radially outer end of the first rotor core, which is located on the second rotor core side, and the second rotor core are positioned on opposite sides in the axial direction of an axial end of the exciting coil, which is located on the first rotor core side, and
an axial end of a radially outer end of the second rotor core, which is located on the first rotor core side, and the first rotor core are positioned on opposite sides in the axial direction of the axial end of the exciting coil, which is located on the second rotor core side.

2. The hybrid excitation rotating electrical machine according to claim 1, wherein
no component of the rotor is present radially outward of the exciting coil.

3. The hybrid excitation rotating electrical machine according to claim 1, wherein
the exciting coil is placed and formed so that a radial position of a radially outer end of the exciting coil overlaps a region corresponding to a radial position of the air gap between the first or second rotor core and the stator.

4. The hybrid excitation rotating electrical machine according to claim 1, wherein
a lead wire of the exciting coil extends in the stator and is extended to outside.

5. The hybrid excitation rotating electrical machine according to claim 4, wherein
the lead wire of the exciting coil extends in a slot of the stator and is extended to the outside.

6. The hybrid excitation rotating electrical machine according to claim 1, wherein:
the stator includes a first end stator core placed radially outward of the first rotor core so as to face the first rotor core with the air gap, a second end stator core placed radially outward of the second rotor core so as to face the second rotor core with the air gap, and a central stator core interposed between the first end stator core and the second end stator core in the axial direction, and having an inner diameter larger than that of the first and second end stator cores, and the first end stator core, the second end stator core, and the central stator core are separated in the axial direction;
the hybrid excitation rotating electrical machine includes:
a coil holding member that holds the exciting coil; and
a fixing attachment member which is fixed and placed in a space formed radially inward of the central stator core, and to which the coil holding member is attached.

7. The hybrid excitation rotating electrical machine according to claim 6, wherein:
the coil holding member has support portions formed in a forked manner and having at tip ends of the support portions pawl portions protruding outward away from each other, and
the fixing attachment member has two insertion holes in which the support portions are inserted, and a seat portion which adjoins each of the insertion holes and with which each of the pawl portions is engaged.

8. The hybrid excitation rotating electrical machine according to claim 7, wherein
the insertion hole is formed so that the size of the insertion hole on an inlet side where the support portion is inserted is larger in the direction in which the pawl portion protrude than the size of the insertion hole on an outlet side.

9. The hybrid excitation rotating electrical machine according to claim 2, wherein
the exciting coil is placed and formed so that a radial position of a radially outer end of the exciting coil overlaps a region corresponding to a radial position of the air gap between the first or second rotor core and the stator.

10. The hybrid excitation rotating electrical machine according to claim 9, wherein
a lead wire of the exciting coil extends in the stator and is extended to outside.

11. The hybrid excitation rotating electrical machine according to claim 10, wherein
the lead wire of the exciting coil extends in a slot of the stator and is extended to the outside.

12. The hybrid excitation rotating electrical machine according to claim 11, wherein:
the stator includes a first end stator core placed radially outward of the first rotor core so as to face the first rotor core with the air gap, a second end stator core placed radially outward of the second rotor core so as to face the second rotor core with the air gap, and a central stator core interposed between the first end stator core and the second end stator core in the axial direction, and having an inner diameter larger than that of the first and second end stator cores, and the first end stator core, the second end stator core, and the central stator core are separated in the axial direction;
the hybrid excitation rotating electrical machine includes:
a coil holding member that holds the exciting coil; and
a fixing attachment member which is fixed and placed in a space formed radially inward of the central stator core, and to which the coil holding member is attached.

13. The hybrid excitation rotating electrical machine according to claim 12, wherein:
the coil holding member has support portions formed in a forked manner and having at tip ends of the support portions pawl portions protruding outward away from each other, and
the fixing attachment member has two insertion holes in which the support portions are inserted, and a seat portion which adjoins each of the insertion holes and with which each of the pawl portions is engaged.

14. The hybrid excitation rotating electrical machine according to claim 13, wherein
the insertion hole is formed so that the size of the insertion hole on an inlet side where the support portion is inserted is larger in the direction in which the pawl portion protrude than the size of the insertion hole on an outlet side.

15. The hybrid excitation rotating electrical machine according to claim 2, wherein
a lead wire of the exciting coil extends in the stator and is extended to outside.

16. The hybrid excitation rotating electrical machine according to claim 15, wherein
the lead wire of the exciting coil extends in a slot of the stator and is extended to the outside.

17. The hybrid excitation rotating electrical machine according to claim 3, wherein
a lead wire of the exciting coil extends in the stator and is extended to outside.

18. The hybrid excitation rotating electrical machine according to claim 17, wherein the lead wire of the exciting coil extends in a slot of the stator and is extended to the outside.

* * * * *